United States Patent
Aso et al.

(10) Patent No.: US 9,702,366 B2
(45) Date of Patent: Jul. 11, 2017

(54) PUMP, REFRIGERATION CYCLE DEVICE, AND METHOD OF PRODUCING PUMP

(75) Inventors: Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 506 days.

(21) Appl. No.: 14/353,887

(22) PCT Filed: Nov. 14, 2011

(86) PCT No.: PCT/JP2011/006334
§ 371 (c)(1),
(2), (4) Date: Apr. 24, 2014

(87) PCT Pub. No.: WO2013/072948
PCT Pub. Date: May 23, 2013

(65) Prior Publication Data
US 2014/0294626 A1    Oct. 2, 2014

(51) Int. Cl.
*F04D 29/62* (2006.01)
*F04D 25/06* (2006.01)
(Continued)

(52) U.S. Cl.
CPC ........... *F04D 25/06* (2013.01); *F04D 13/064* (2013.01); *F04D 13/0606* (2013.01);
(Continued)

(58) Field of Classification Search
CPC ........ Y10T 29/49236; Y10T 29/49243; H02K 11/215; H02K 3/522; H02K 1/185;
(Continued)

(56) References Cited

U.S. PATENT DOCUMENTS 5,055,000 A * 10/1991 Akhter ................ F04D 15/0218
417/40
5,232,350 A * 8/1993 Richardson ........... D06F 39/085
417/360

(Continued)

FOREIGN PATENT DOCUMENTS

JP    2006-200427 A    8/2006
JP    2008-025454 A    2/2008
(Continued)

OTHER PUBLICATIONS

Machine Translation of Japanese Patent JP 2010106733 A to Aso et al.*

(Continued)

*Primary Examiner* — Peter J Bertheaud
*Assistant Examiner* — Dnyanesh Kasture
(74) *Attorney, Agent, or Firm* — Posz Law Group, PLC

(57) ABSTRACT

In a pump, at least one of leg portions of a pilot hole component are extended by a specified distance compared to the other leg portions toward a side opposite to a surface where pilot holes are exposed, and the pilot holes formed in the some leg portions extend through the some leg portions between end planes of the some leg portions and are exposed in the other end plane of the molded stator, the other end plane located at the other end in the axial direction.

14 Claims, 17 Drawing Sheets

(51) Int. Cl.
*F04D 13/06* (2006.01)
*F04D 29/42* (2006.01)
*F04D 29/60* (2006.01)
*H02K 1/18* (2006.01)
*H02K 3/52* (2006.01)
*H02K 11/215* (2016.01)
*H02K 5/22* (2006.01)

(52) U.S. Cl.
CPC ......... *F04D 29/426* (2013.01); *F04D 29/605* (2013.01); *F04D 29/628* (2013.01); *H02K 1/185* (2013.01); *H02K 3/522* (2013.01); *H02K 11/215* (2016.01); *F05D 2230/64* (2013.01); *F05D 2300/43* (2013.01); *H02K 5/225* (2013.01); *Y10T 29/49236* (2015.01)

(58) Field of Classification Search
CPC . H02K 5/225; F05D 2300/43; F05D 2230/64; F04D 25/06; F04D 29/605; F04D 13/064; F04D 29/426; F04D 13/0606; F04D 29/628; F04D 29/62
See application file for complete search history.

(56) References Cited

U.S. PATENT DOCUMENTS 5,806,169 A * 9/1998 Trago ................. H02K 5/08
264/272.2
2005/0176537 A1 * 8/2005 Matsumoto .......... B62M 11/145
474/80
2008/0175732 A1 * 7/2008 Sakata .................. H02K 3/522
417/410.1

FOREIGN PATENT DOCUMENTS

| JP | 2009-144661 A | 7/2009 |
|----|---------------|--------|
| JP | 2010-106733 A | 5/2010 |
| JP | 2010-229904 A | 10/2010 |
| JP | 2011-080595 A | 4/2011 |

OTHER PUBLICATIONS

Machine Translation of Japanese Patent JP 2010229904 A to Aso et al.*
Office Action mailed Dec. 9, 2014 issued in corresponding JP patent application No. 2013-543979 (and English translation).
Office Action mailed Aug. 4, 2015 in the corresponding JP application No. 2013-543979 (with English translation).
Extended European Search Report dated May 22, 2015 issued in corresponding EP patent application No. 11875604.8.
International Search Report of the International Searching Authority mailed Jan. 17, 2012 for the corresponding international application No. PCT/JP2011/006334 (and English translation).

* cited by examiner

PUMP, REFRIGERATION CYCLE DEVICE, AND METHOD OF PRODUCING PUMP

CROSS REFERENCE TO RELATED APPLICATION

This application is a U.S. national stage application of International Application No. PCT/JP2011/006334 filed on Nov. 14, 2011, the disclosure of which is incorporated by reference.

TECHNICAL FIELD

The present invention relates to a pump, a refrigeration cycle device for example, an air-conditioning apparatus, a floor heating apparatus, a water heating apparatus, or the like, and a method of producing the pump.

BACKGROUND ART

Various inventions relating to pumps have been proposed. One of examples of such inventions has been disclosed as follows: "reducing the gap between a stator core and a magnet of a pump so as to improve motor efficiency and capability of cooling coils and a control circuit" (see, for example, Patent Literature 1). In the pump described in Patent Literature 1, the gap between the stator core and the magnet is reduced by reducing the thickness of a separation plate. The reduction of the thickness of the separation plate is achieved by inserting the coils, the stator core, the control circuit, and the separation plate, and surrounding the resultant structure with molded resin. In the pump described in Patent Literature 1, spaces around the coils and the control circuit, which produce heat, and the separation plate are filled without a gap with the molded resin having a good thermal conductivity. Thus, the thermal conductivity is improved, and accordingly, the capability of cooling can be improved.

Also, a technique, in which "a molded stator and a pump unit can be firmly attached to each other", has been disclosed (see, for example, Patent Literature 2). The pump described in Patent Literature 2 includes "[A] molded stator that includes a stator, which includes coils and a board. The coils are wound around a plurality of teeth, which are provided with insulating portions, of a stator core. An electrical component is mounted on the board and a lead cable guiding component, through which a lead cable is drawn out, is attached to the board, which is attached to the stator. The molded stator also includes a pilot hole component that has a plurality of leg portions having pilot holes. The stator and the pilot hole component are attached to each other to form a stator assembly, around which a resin for molding is molded, and the pilot holes of the leg portions of the pilot hole component is exposed in one end plane in the axial direction. The pump also includes the pump unit that includes a casing having an inlet and an outlet for water, a cup-shaped bulkhead component that has a flange portion and a cup-shaped bulkhead portion. The rotor is attached in the cup-shaped bulkhead portion such that a shaft, engaged with the rotor, is not rotatable. A rotor portion and an impeller are provided to the rotor. The cup-shaped bulkhead component is attached to the molded stator to form the pump unit having a plurality of screw holes near an outer circumferential portion thereof. The pump also includes a plurality of self-tapping screws. In the pump, the pump unit and the molded stator are attached to each other by screwing the self-tapping screws into the exposed pilot holes of the molded stator through the screw holes of the pump unit".

CITATION LIST

Patent Literature

Patent Literature 1: Japanese Unexamined Patent Application Publication No. 2006-200427 (page 3, abstract)
Patent Literature 2: Japanese Unexamined Patent Application Publication No. 2010-106733 (pages 7 to 8, claim 1)

SUMMARY OF INVENTION

Technical Problem

In the pump described in Patent Literature 1, a casing and a stator, which is surrounded by a molded thermosetting resin such as unsaturated polyester resin, are attached to each other by self-tapping screws inserted through screw holes provided in the casing. Thus, as the molded resin is degraded due to vibration and the like, strength with which the casing and the stator are assembled together may be reduced.

In the pump described in Patent Literature 2, the casing (casing 41) has, for example, three attachment legs (attachment legs 45) having holes (holes 45a) for securing the pump to, for example, a tank unit of a heat-pump water heater apparatus. However, the molded stator does not have a portion for securing the molded stator to the tank unit or the like. Thus, the casing may break when the casing becomes unable to stand the weight of the pump, or fatigue fracture may occur in the casing due to vibration caused by the pump.

Furthermore, when the self-tapping screws are directly screwed into the molded stator in order to secure the pump described in Patent Literature 2 to a tank unit or the like, in which the pump is installed, as the molded resin is degraded due to vibration and the like, strength with which the casing and the molded stator are assembled together may be reduced. Furthermore, the cost of the pump described in Patent Literature 2 may be increased when separate components having pilot holes, into which the self-tapping screws are screwed, are provided in the molded stator through insert molding.

The present invention is proposed to solve the above-described problems. An object of the present invention is to provide a pump and a refrigeration cycle device that allow the pump and a tank unit or the like, in which the pump is installed, are firmly attached to each other and to provide a method of producing the pump.

Solution to Problem

A pump according to the present invention includes a molded stator that includes a stator, which includes coils and a board. The coils are wound around a plurality of teeth of a stator core. The teeth are provided with insulating portions. An electrical component is mounted on the board, and a lead cable guiding component, through which a lead cable is drawn out, is attached to the board, which is attached to the stator. The molded stator also includes a pilot hole component that has a plurality of leg portions having pilot holes for attachment of a pump unit. The pilot hole component and the stator are integrated with each other by a resin for molding. The pilot holes of the leg portions of the pilot hole component are exposed in one end plane of the molded stator, the one end plane being located at one end in an axial direction. The pump also includes the pump unit that includes a casing having an inlet and an outlet, a cup-shaped bulkhead component that has a flange portion and the cup-shaped bulkhead portion, which is attached in the cup-shaped bulkhead portion such that a shaft, engaged with the rotor, is not rotatable. A rotor portion and an impeller are provided to the rotor, the cup-shaped bulkhead component is attached to the molded stator to form the pump unit having a plurality of screw holes near an outer circumferential portion thereof. The pump also includes a plurality of self-tapping screws. In the pump, the pump unit and the molded stator are attached to each other by screwing the self-tapping screws into the exposed pilot holes of the molded stator through the screw holes of the pump unit so as to form the pump. In the pump, at least one of the leg portions of the pilot hole component are extended by a specified distance compared to the other leg portion or leg portions toward a side opposite to the end plane where the pilot holes are opening, and the pilot holes formed in the some leg portions extend through the some leg portions between end planes of the some leg portions, the end planes being located at both ends in the axial direction, and are exposed in the other end plane of the molded stator.

A refrigeration cycle device according to the present invention includes the above-described pump disposed in a water circuit connected to a refrigerant circuit through a refrigerant-water heat exchanger.

A method of producing a pump according to the present invention includes a step of producing a stator by providing a tooth of a stator core with an insulating portion and winding a coil around the tooth provided with the insulating portion, and producing a board on which an electronic component is mounted and to which a lead cable guiding component for drawing out a lead cable is attached. The method also includes a step of producing a rotor portion by integrating a resin magnet and a sleeve bearing provided inside the resin magnet with each other by resin and producing an impeller. The method also includes a step of attaching the board to the stator, producing a rotor by attaching the impeller to the rotor portion, and producing a cup-shaped bulkhead component, a shaft, and a thrust bearing. The method also includes a step of soldering a terminal of the stator and the board to each other, attaching the rotor to the cup-shaped bulkhead component, forming a casing having an inlet and an outlet, and producing a pilot hole component having a plurality of leg portions that have pilot holes, are connected to one another, and are formed such that at least one of the leg portions are extended by a specified distance toward a side opposite to a side where the pilot holes are exposed and the pilot holes of the some leg portions extend through the some leg portions between end planes of the some leg portions. The method also includes a step of producing a molded stator by integrating the stator and the pilot hole component with each other by a resin for molding, assembling a pump unit by securing the casing to the cup-shaped bulkhead component that has a flange portion and a cup-shaped bulkhead portion, wherein the rotor is attached in the cup-shaped bulkhead portion such that a shaft, engaged with the rotor, is not rotatable, the rotor portion and the impeller are provided to the rotor, and producing the pump unit having a plurality of screw holes near an outer circumferential portion thereof by attaching the cup-shaped bulkhead component. The method also includes a step of attaching the pump unit and the molded stator to each other by fitting together the pump unit and the molded stator to each other and screwing self-tapping screws into exposed pilot holes of the molded stator through the screw holes of the pump unit.

Advantageous Effects of Invention

The pump according to the present invention is attached to a tank unit or the like, in which the pump is installed, by screwing the self-tapping screws into the pilot holes exposed in the leg portions of the molded stator through screw holes of a pump securing portion provided in the tank unit of a water heater apparatus or the like, in which the pump is installed. Thus, the pump unit and the molded stator can be firmly attached to each other, and the pump and the tank unit or the like can be firmly attached to each other.

The above-described pump is installed in the refrigeration cycle device according to the present invention. Thus, as the performance and quality of the pump and productivity with which the pump is produced are improved, the performance and the quality of the refrigeration cycle device can be improved, and the cost of the refrigeration cycle device is reduced.

According to the method of producing the pump according to the present invention, the pilot holes used for attaching the pump unit to the molded stator also serve as the pilot holes used for attaching the pump to a tank unit or the like, in which the pump is installed. Thus, without preparing a separate component, the pump unit and the molded stator can be firmly attached to each other, and the pump can be firmly attached to the tank unit or the like, in which the pump is installed.

DESCRIPTION OF EMBODIMENT

Embodiment according to the present invention will be described below with reference to the drawings.

Figure 1:
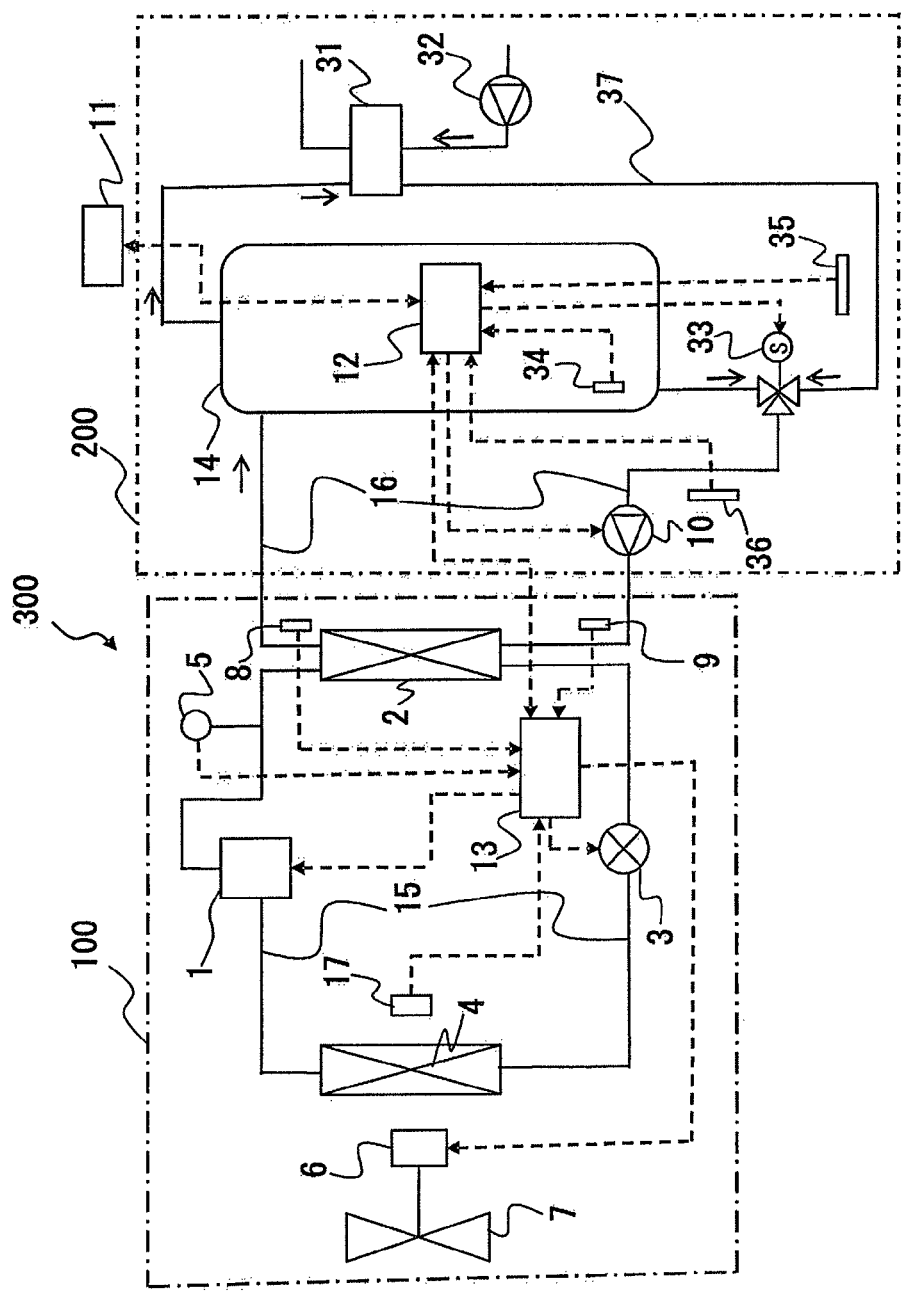
FIG. 1 is a schematic circuit diagram of an example of a circuit configuration of a heat-pump water heating apparatus according to Embodiment of the present invention.

FIG. 1 is a schematic circuit diagram of an example of a circuit configuration of a heat-pump water heating apparatus 300 (referred to as the water heating apparatus 300 hereafter) according to Embodiment of the present invention. An outline of the heat-pump water heating apparatus, which is an example of a refrigeration cycle device, in which a pump according to Embodiment of the present invention is used, is briefly described with reference to FIG. 1. It is noted that, in the drawings herein including FIG. 1, the relationships of the sizes of components may be different from those of the actual components.

The water heating apparatus 300, which is an example of the refrigeration cycle device equipped with a refrigerant circuit, includes a heat pump unit 100, a tank unit 200, and an operation unit 11. The operation unit 11 allows a user to, for example, operate the water heating apparatus 300.

Referring to FIG. 1, the heat pump unit 100 includes a compressor 1 (for example, a rotary compressor, a scroll compressor, a vane-type compressor, or the like), a refrigerant-water heat exchanger 2, a pressure reducing device 3, an evaporator 4, a pressure detector 5, a heated water temperature detecting means 8 for the refrigerant-water heat exchanger 2, a supplied water temperature detecting means 9 for the refrigerant-water heat exchanger 2, an outside air temperature detecting means 17, a fan 7, a fan motor 6, and a heat pump unit controller 13. The compressor 1 compresses a refrigerant. The refrigerant-water heat exchanger 2 causes the refrigerant and water to exchange heat. The pressure reducing device 3 reduces the pressure of a high-pressure refrigerant and expands the high-pressure refrigerant. The evaporator 4 causes a low-pressure two-phase refrigerant to evaporate. The pressure detector 5 detects a discharge pressure of the compressor 1. The fan 7 sends air to the evaporator 4. The fan motor 6 drives the fan 7.

The compressor 1, the refrigerant side of the refrigerant-water heat exchanger 2, the pressure reducing device 3, and the evaporator 4 are connected to one another in a cyclic form by a refrigerant pipe 15, thereby forming a refrigerant circuit. The heat pump unit controller 13 receives signals from the pressure detector 5, the heated water temperature detecting means 8, the supplied water temperature detecting means 9, and the outside air temperature detecting means 17, controls the rotation speed of the compressor 1, the opening degree of the pressure reducing device 3, and the rotation speed of the fan motor 6, and exchanges signals with a tank unit controller 12.

The tank unit 200 includes a hot water tank 14, a bathwater reheating heat exchanger 31, a bathwater circulator 32, a pump 10, a mixing valve 33, a tank water temperature detector 34, a reheated water temperature detector 35, a mixed water temperature detector 36, and the tank unit controller 12. Hot water heated by heat exchange with the high-temperature high-pressure refrigerant in the refrigerant-water heat exchanger 2 is contained in the hot water tank 14. The bathwater reheating heat exchanger 31 causes bathwater to be reheated. The pump 10 is a hot water circulator disposed between the refrigerant-water heat exchanger 2 and the hot water tank 14. The mixing valve 33 is connected to the refrigerant-water heat exchanger 2, the hot water tank 14, and the bathwater reheating heat exchanger 31. The reheated water temperature detector 35 detects the temperature of water having passed through the bathwater reheating heat exchanger 31. The mixed water temperature detector 36 detects the temperature of water having passed through the mixing valve 33.

The hot water tank 14, the mixing valve 33, the pump 10, the water side of the refrigerant-water heat exchanger 2 are connected to one another by a hot water circulation pipe 16. The hot water tank 14 and the mixing valve 33 are connected to each other by a bathwater reheating pipe 37. The tank unit controller 12 receives signals from the tank water temperature detector 34, the reheated water temperature detector 35, and the mixed water temperature detector 36, controls the rotation speed of the pump 10 and opening and closing of the mixing valve 33, and exchanges signals with the operation unit 11. Although the tank unit controller 12 seems to be disposed in the hot water tank 14 in FIG. 1, the tank unit controller 12 is actually disposed outside the hot water tank 14.

The operation unit 11 is a remote controller or an operation panel provided with switches and the like so as to allow the user to perform operations such as setting of the temperature of water and issuing instruction for supplying hot water.

A typical water heating operation in the water heating apparatus 300 having the above-described structure is described. Upon reception of a water heating operation instruction from the operation unit 11 or the tank unit 200, the heat pump unit controller 13 controls actuators (drive components of the compressor 1, pressure reducing device 3, fan motor 6, and the like) so as to perform the water heating operation.

Specifically, the heat pump unit controller 13 provided in the heat pump unit 100 controls the rotation speed of the compressor 1, the opening degree of the pressure reducing device 3, and the rotation speed of the fan motor 6 in accordance with values detected by the pressure detector 5, the heated water temperature detecting means 8, the supplied water temperature detecting means 9, and the outside air temperature detecting means 17, information from the operation unit 11 transmitted via the tank unit controller 12, and the like.

The heat pump unit controller 13 and the tank unit controller 12 exchange the value detected by the heated water temperature detecting means 8. The tank unit controller 12 controls the rotation speed of the pump 10 so that the temperature detected by the heated water temperature detecting means 8 reaches a target heated water temperature.

In the water heating apparatus 300 controlled as described above, the temperature of the high-temperature high-pressure refrigerant discharged from the compressor 1 is decreased while the refrigerant transfers heat to a water supply circuit side in the refrigerant-water heat exchanger 2. The pressure of the high-pressure low-temperature refrigerant having transferred heat and passed through the refrigerant-water heat exchanger 2 is reduced by the pressure reducing device 3. The refrigerant having passed through the pressure reducing device 3 flows into the evaporator 4 and receives heat from outside air. The low-pressure refrigerant having exited the evaporator 4 is sucked into the compressor 1 and circulated. Thus, a refrigeration cycle is formed.

Water in a lower portion of the hot water tank 14 is guided to the refrigerant water heat exchanger 2 by driving the pump 10 as a hot water circulator. Here, the water is heated by heat transferred from the refrigerant-water heat exchanger 2, and returned to an upper portion of the hot water tank 14 through the hot water circulation pipe 16. Thus, the heat is stored.

As described above, in the water heating apparatus 300, the pump 10 is used as the hot water circulator that causes water to circulate in the hot water circulation pipe 16 between the hot water tank 14 and the refrigerant-water heat exchanger 2.

Figure 2:
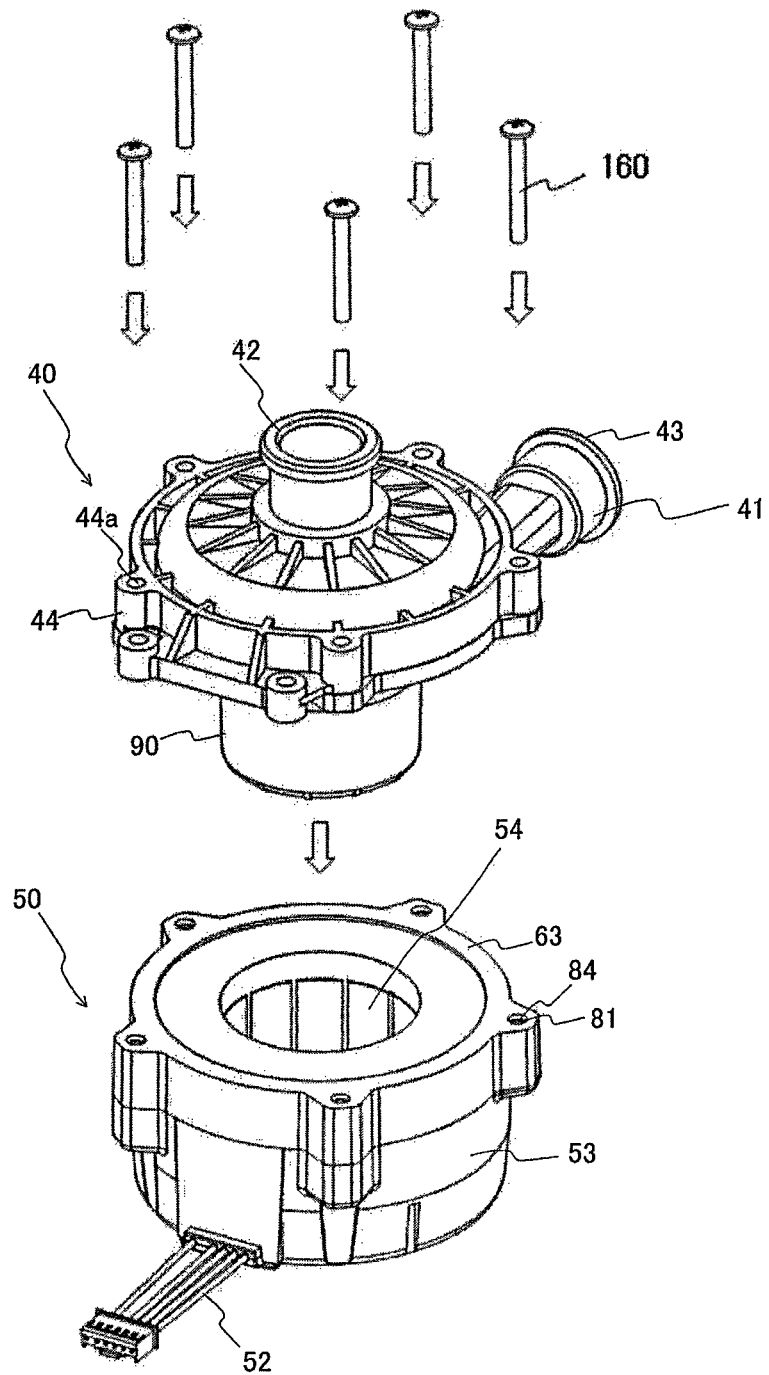
FIG. 2 is an exploded perspective view of a pump according to Embodiment of the present invention.

Next, the pump 10 according to Embodiment of the present invention and being used as the hot water circulator is described. FIG. 2 is an exploded perspective view of the pump 10.

As illustrated in FIG. 2, the pump 10 includes a pump unit 40, a molded stator 50, and self-tapping screws 160 (five self-tapping screw 160 are provided in an example illustrated in FIG. 2). The pump unit 40 sucks and discharges water by rotation of a rotor (which will be described later). The molded stator 50 includes a mechanism that drives the rotor. The self-tapping screws 160 fasten the pump unit 40 and the molded stator 50 to each other. The number of the self-tapping screws 160 is not limited to five.

The pump 10 is assembled by screwing five self-tapping screws 160 to pilot holes 84 of a pilot hole component 81 (see FIG. 5 that will be described later) embedded in the molded stator 50 through screw holes 44a formed in boss portions 44 of the pump unit 40.

Figure 3:
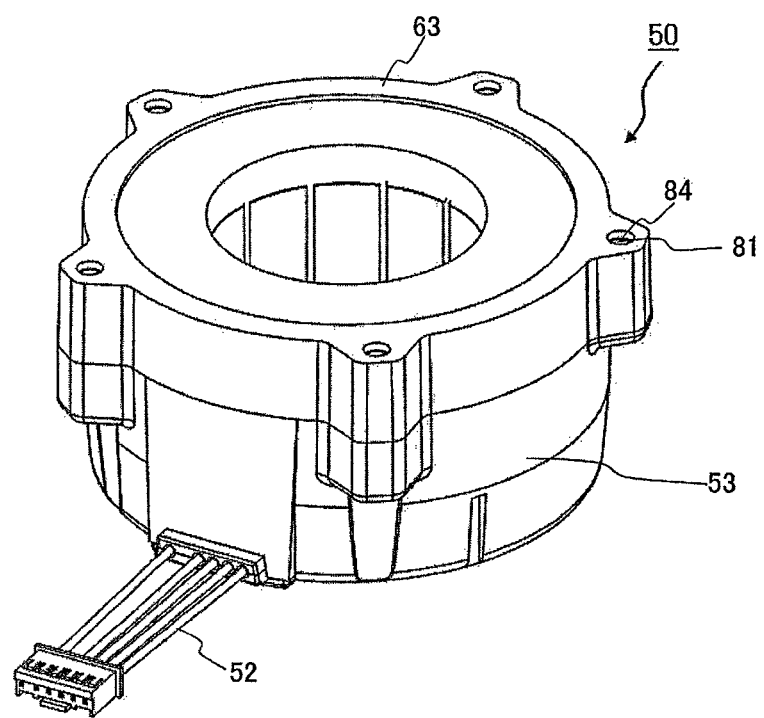
FIG. 3 is a perspective view of a molded stator of the pump according to Embodiment of the present invention.
Figure 4:
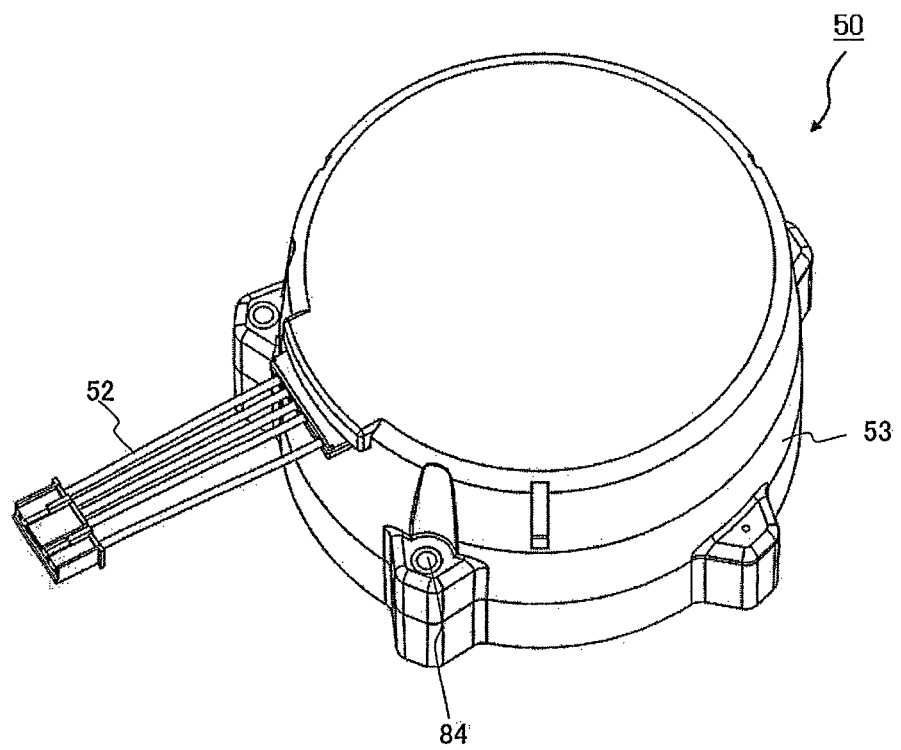
FIG. 4 is a rear perspective view of the molded stator of the pump according to Embodiment of the present invention.
Figure 5:
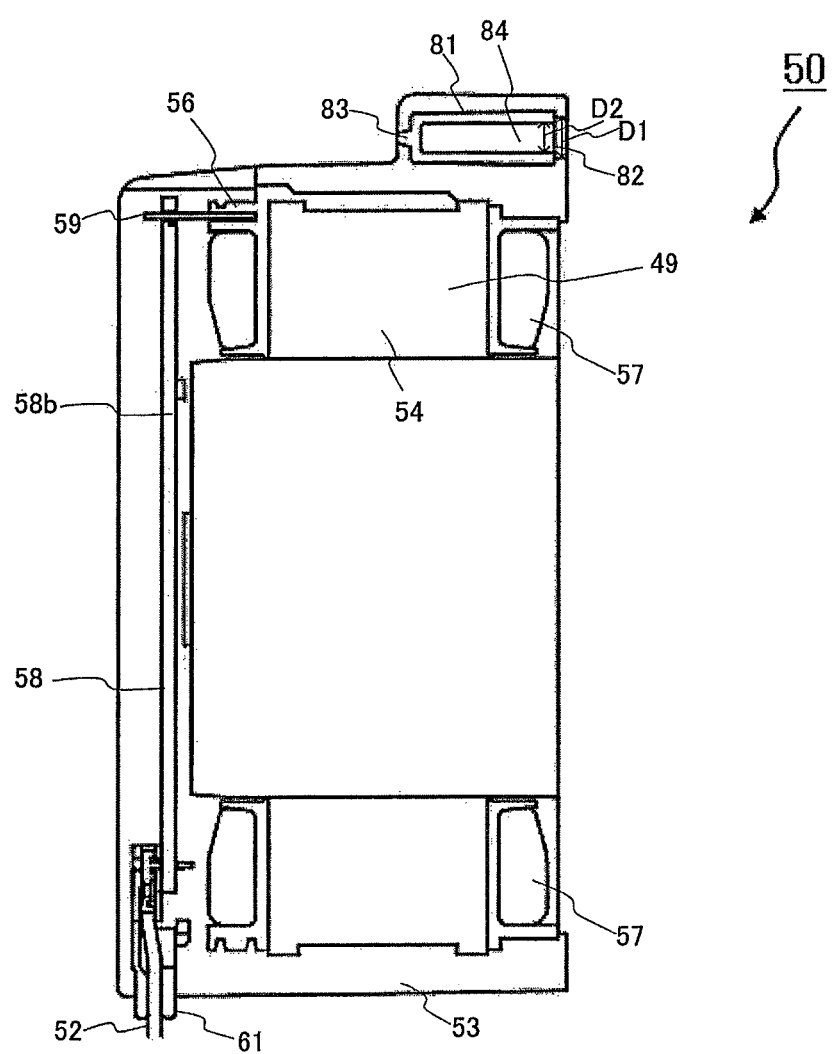
FIG. 5 is a sectional view of the molded stator of the pump according to Embodiment of the present invention.
Figure 6:
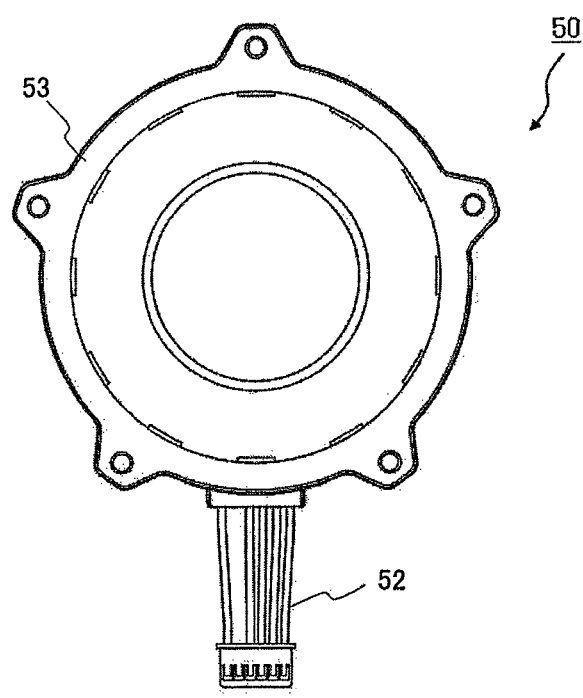
FIG. 6 is a front view of the molded stator of the pump according to Embodiment of the present invention.
Figure 7:
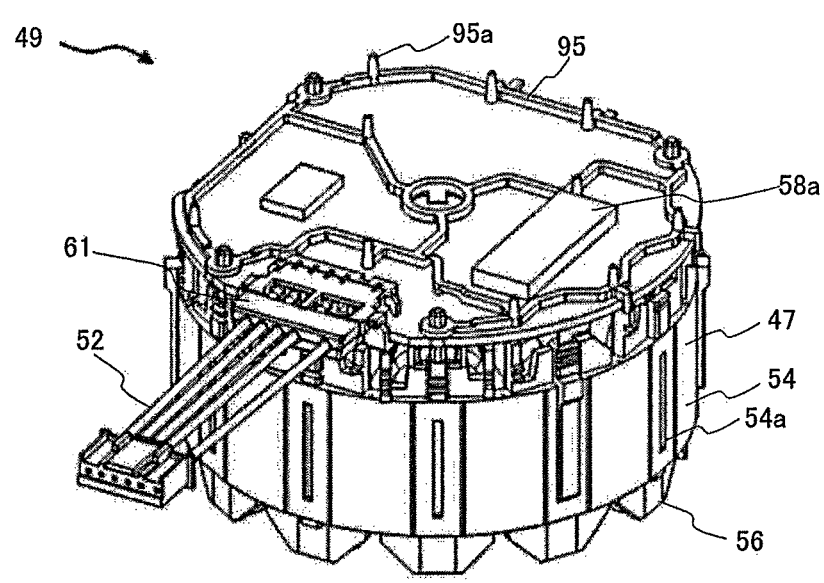
FIG. 7 is an exploded perspective view of a stator assembly of the pump according to Embodiment of the present invention.
Figure 7:
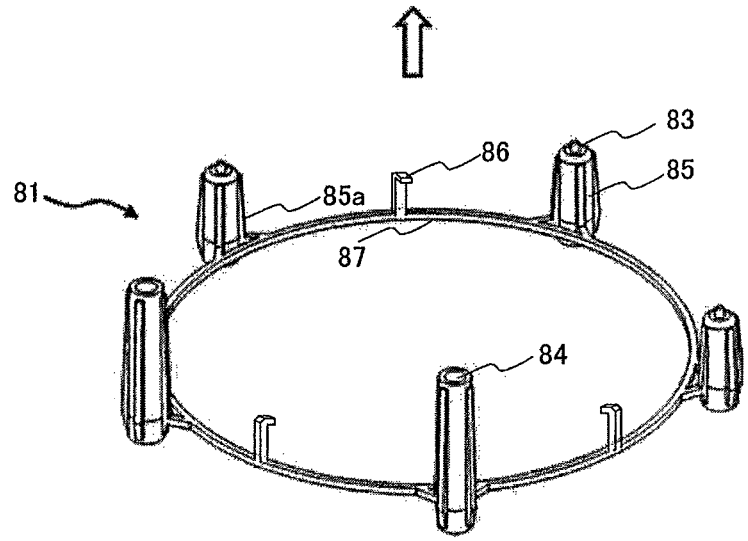

Initially, the structure of the molded stator 50 is described. FIG. 3 is a perspective view of the molded stator 50. FIG. 4 is a rear perspective view of the molded stator 50, FIG. 5 is a sectional view of the molded stator 50. FIG. 6 is a front view of the molded stator 50, and FIG. 7 is an exploded perspective view of a stator assembly 49.

As illustrated in FIGS. 3 to 6, the molded stator 50 can be obtained by molding a resin for molding 53 around the stator assembly 49 (to be described later).

One end plane (on the pump unit 40 side) of the molded stator 50 in the axial direction of the molded stator 50 has a pump unit installation surface 63, which is flat along an outer circumferential portion of the molded stator 50.

Substantially cylindrical leg portions 85 (see FIGS. 7 and 8) of the pilot hole component 81, the leg portions 85 being formed of molded resin, are embedded in the axial direction in five corners around the axis of the resin for molding 53. The pilot holes 84 are open at the pump unit installation surface 63 with the pilot hole component 81 embedded in the resin for molding. When molding the resin for molding 53, end planes (on the pump unit 40 side) at ends of the leg portions 85 of the pilot hole component 81 on one side serve as mold pressing portions 82 pressed against a mold (see FIG. 5). For this reason, portions of the entirety of end planes of the pilot hole component 81 are exposed at positions recessed in the axial direction from the pump unit installation surface 63 toward the inside of the resin for molding by a specified distance. The exposed portions are the mold pressing portions 82 and the pilot holes 84 for the self-tapping screws 160.

A lead cable 52 of the stator assembly 49, which will be described later, extends from a portion of the molded stator 50, the portion being near the end plane of the molded stator 50 opposite to the pump unit 40 side in the axial direction, to the outside of the molded stator 50.

When the resin for molding 53 (thermosetting resin) is molded to obtain the molded stator 50, positioning of the molded stator 50 in the axial direction is performed with end planes of a plurality of projections 95a, the end planes being formed on the outer side in the axial direction in a board pressing component 95 (see FIG. 7), serving as mold pressing portions pressed against an upper half of the mold. Thus, the end planes (mold pressing surfaces) of the plurality of projections 95a, the end planes being on the outer side in the axial direction, are exposed from the end plane of the molded stator 50, the end plane being on a board 58 side in the axial direction.

End surfaces of insulating portions 56 on a non-connecting side (pump unit 40 side), the end planes being at ends in the axial direction, serve as mold pressing portions pressed against a lower half of the mold. For this reason, the end planes of the insulating portions 56 on the non-connecting side are exposed from an end plane of the molded stator 50, the end plane on a side opposite to the board 58 side in the axial direction (not shown).

When the resin is molded to obtain the molded stator 50, positioning in the radial direction of the molded stator 50 is performed by engagement of an inner circumferential surface of a stator core 54 with the mold. For this reason, tip end portions (inner circumference portions) of teeth of the stator core 54 of the stator assembly 49 are exposed from an inner circumferential portion of the molded stator 50 illustrated in FIG. 3.

An inner structure of the molded stator 50, that is, the stator assembly 49 (the lead cable 52, the stator core 54, the insulating portions 56, coils 57, the board 58, terminals 59, and the like illustrated in FIG. 5) and the pilot hole component 81 will be described later.

Next, the stator assembly 49 is described. As illustrated in FIG. 7 the stator assembly 49 includes a stator 47 and the pilot hole component 81.

The stator assembly 49 is produced in the following procedure.

(1) Electrical steel sheets having a thickness of about 0.1 to 0.7 mm are punched to form strips, which are subjected to caulking, welding, bonding, or the like to produce the laminated strip-shaped stator core 54. The strip-shaped stator core 54 includes a plurality of the teeth. The tip end portions of the teeth of the stator core 54 are exposed from the inner circumferential portion of the molded stator 50 illustrated in FIG. 3. Since the stator core 54 described here includes twelve teeth connected to one another by a thin connecting portion, the tip end portions of the teeth of the stator core 54 illustrated in FIG. 3 are exposed at twelve positions. In FIG. 3, five teeth out of the twelve teeth are visible.

(2) The teeth of the stator core 54 are provided with the insulating portions 56. The insulating portions 56 are formed of, for example, a thermoplastic resin such as PBT (polybutylene terephthalate). The insulating portions 56 are integrally or separately formed with or from the stator core 54.

(3) The coils 57 are wound in concentrated winding around the teeth provided with the insulating portions 56. Twelve concentrated winding coils 57 are connected to one another so as to form windings of a three-phase single Y connection.

(4) Since the windings are of the three-phase single Y connection, the terminals 59 (see FIG. 5, a neutral terminal and power terminals through which power is supplied), to which the coils 57 of each phase (U-phase, V-phase, W-phase) are connected, are attached to the connection sides of the insulating portions 56. Three of the power terminal and one neutral terminal are provided.

(5) The board 58 is attached to the insulating portions 56 on the connecting side (a side where the terminals 59 are attached). The board 58 is clamped between the insulating portions 56 and the board pressing component 95 by the board pressing component 95. An IC 58a (drive element) that drives a motor (brushless DC motor), a Hall element 58b (see FIG. 5, position detecting element) that detects the position of a rotor 60, and the like are mounted on the board 58. The IC 58a, which is mounted on the board pressing component 95 side of the board 58, is visible in FIG. 7. The Hall element 58b, which is on the side opposite to the side where the IC 58a is mounted, is not visible in FIG. 7. The IC 58a and the Hall element 58b are defined as electronic components. A lead cable guiding component 61, through which the lead cable 52 is drawn out, is attached at a cut portion near an outer circumferential edge portion of the board 58.

(6) When the board 58, to which the lead cable guiding component 61 is attached, is secured to the insulating portions 56 by the board pressing component 95 and the pilot hole component 81 is attached to the stator 47, to which the terminals 59 and the board 58 are soldered, the stator assembly 49 is completed.

Figure 8:
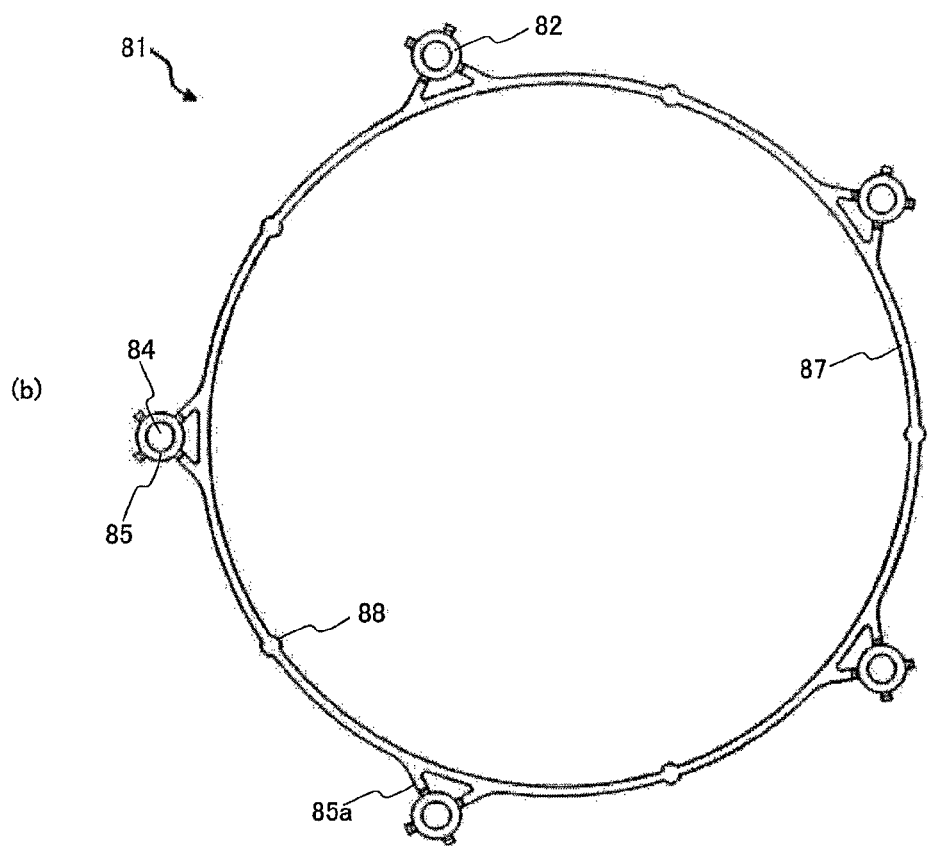
FIG. 8 includes views of a pilot hole component of the pump according to Embodiment of the present invention, illustrating a front view in view (a) and a plan view in view (b).
Figure 8:
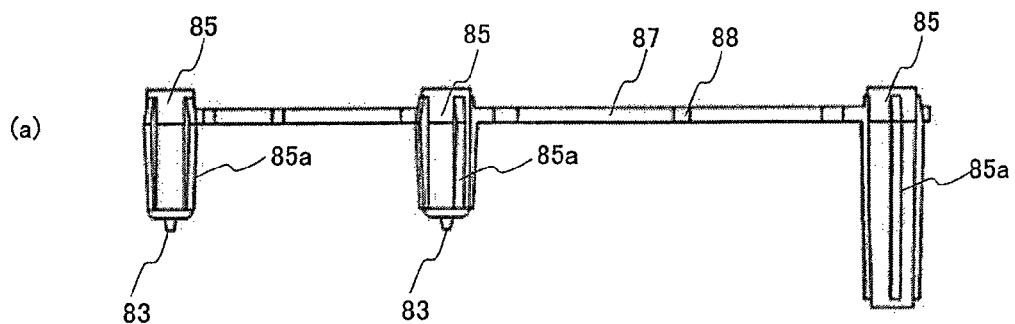

Views (a) and (b) of FIG. 8 are respectively a front view and a plan view of the pilot hole component 81. The structure of the pilot hole component 81 is described with reference to FIG. 8. The pilot hole component 81 are formed by molding a thermoplastic resin such as PBT (polybutylene terephthalate).

As illustrated in FIG. 8, the pilot hole component 81 has a thin connecting portion 87 and the plurality of substantially cylindrical leg portions 85, which are connected to one another by the thin connecting portion 87. The leg portions 85 have pilot holes 84 (see view (b) of FIG. 8), into which the self-tapping screws 160 are screwed when the pilot hole component 81 is attached to the pump unit 40, and projections 83, which are brought into contact with the mold for molding during molding. In an example illustrated in FIG. 8, the pilot hole component 81 has five leg portions 85. In order to prevent the pilot hole component 81 from being removed from the stator 47 after the resin has been molded around the pilot hole component 81 and the stator 47, the substantially cylindrical leg portions 85 has a tapered shape, the diameter of which increases toward a central portion with reference to the exposed end planes (the mold pressing portions 82 and end portions of the projections 83) of the leg portions 85.

Also in the pilot hole component 81, a plurality of projections 85a are provided at an outer circumferential portion of each of the leg portions 85 (for example, four projections 85a per leg portion 85) in order to prevent the pilot hole component 81 from being rotated. The projections 85a have a predetermined width in the circumferential direction and a height slightly smaller than that of the leg portions 85 in a height direction of the leg portions 85. In order to prevent the pilot hole component 81 from being rotated, the projections 85a radially project from the outer circumferential portions of the leg portions 85 by a predetermined length. By connecting the substantially cylindrical leg portions 85 to one another by the thin connecting portion 87, the pilot hole component 81 can be set in the mold for molding in a single setting operation. Thus, the processing cost can be reduced.

Some (two in the example illustrated in FIG. 8) of the leg portions 85 of the pilot hole component 81 are extended by a predetermined length compared to the other leg portions 85 toward a side opposite to a side to which the pump unit 40 is attached, and the pilot holes 84, into which the self-tapping screws 160 are screwed when installing the pump unit 40, penetrate through the leg portions 85 between the end planes of the leg portions 85 at both the ends. After the resin has been molded around the pilot hole component 81 and the stator 47, the pilot holes 84 of the extended leg portions 85 are exposed in the end planes of the molded stator 50, the end planes being at the ends in the axial direction of the leg portions 85. The pilot holes 84 of the pilot hole component 81 serve as pilot holes when the pump unit 40 is attached to the molded stator 50 and when the pump 10 is attached to a unit in which the pump 10 is installed. Thus, the pump 10 can be firmly attached to the unit in which the pump 10 is installed without preparing a separate component.

In the example illustrated in FIG. 8, by forming through holes in the leg portions 85, the pilot holes used for attaching the pump unit 40 to the molded stator 50 also serve as the pilot holes used for attaching the pump 10 to a unit in which the pump 10 is installed. However, this does not limit the structure of the pilot holes 84. For example, the following structure is possible: as many leg portions, the leg portions having pilot holes used for attaching the pump unit 40 to the molded stator 50, as required and as many leg portions, the leg portions having pilot holes used for attaching the pump 10 to the unit in which the pump 10 is installed, as required are provided and connected to one another by the thin connecting portion 87. In this case, the leg portions having the pilot holes used for attaching the pump 10 to the unit in which the pump 10 is installed can be disposed at positions suitable for securing the pump 10 to the unit independently of the positions of the leg portions having the pilot holes used for attaching the pump unit 40 to the molded stator 50. Thus, the pump 10 can be more firmly attached to the unit.

Alternatively, the pilot holes used for attaching the pump 10 to the unit in which the pump 10 is installed may extend in arbitrary directions. In this case, the self-tapping screws 160 used for attaching the pump 10 to the unit can be screwed in arbitrary directions, thereby improving work efficiency.

In the connecting portion 87 of the pilot hole component 81, portions substantially central between the leg portions 85 radially project by a specified distance so as to form substantially cylindrical shapes. The substantially cylindrical portions have gates 88 (five gates 88 in FIG. 8), through which the thermoplastic resin for molding the pilot hole component is injected. The gates 88 are each formed to have a substantially cylindrical shape at the positions substantially central between the leg portions 85 and project from the connecting portion 87 by a specified distance. The resin is injected from the portions substantially central between the leg portions 85 through the gates 88. This allows the pilot hole component 81 to be stably formed.

By forming an inner diameter of the pilot holes 84 for the self-tapping screws 160, the pilot holes 84 being provided in the leg portions 85 of the pilot hole component 81, so that the pilot holes have a straight shape, the pilot hole component 81 can be prevented from adhering to a cavity of a mold. This can improve productivity with which the pilot hole component 81 is produced.

The connecting portion 87 of the pilot hole component 81 has a plurality of hooks (hooks 86 in FIG. 7) used for attaching the pilot hole component 81 to the stator 47. The hooks 86 of the pilot hole component 81 are hooked in grooves 54*a* (see FIG. 7) formed in an outer circumferential portion of the stator core 54 of the stator 47. Thus, the stator 47 and the pilot hole component 81 can be set in the mold for molding in a single setting operation. This allows the processing cost to be further reduced.

When molding the resin for molding 53 around the stator assembly 49, in which the pilot hole component 81 is hooked to the stator 47, the pilot hole component 81 is positioned in the axial direction as follows: that is, the end planes (mold pressing portions 82 (see FIG. 8)) on the opening side of the pilot holes 84 for the self-tapping screws 160 and the projections 83 (see FIG. 8) provided on the other end planes of the pilot hole component 81 are clamped by the mold for resin molding.

An outer diameter D2 of the mold pressing portions 82 on the end planes of the pilot hole component 81 on the opening side of the pilot holes 84 for the self-tapping screws 160 is made to be smaller than an outer diameter D1 of the end planes of the pilot hole component 81 on the opening side (see FIG. 5). Thus, the end planes of the pilot hole component 81 are coated with the resin for molding 53 except for the mold pressing portions 82. Accordingly, the end planes on both the side of the pilot hole component 81 are coated with the resin for molding 53, thereby suppressing exposure of the pilot hole component 81. This can improve the quality of the pump 10.

In the molded stator 50, the pilot hole component 81 attached to the stator 47 is integrated with the stator 47 by the resin for molding 53. At this state, the pilot holes 84 for the self-tapping screws 160 of the leg portions 85 of the pilot hole component 81 are exposed. By fitting together the pump unit 40 and the molded stator 50 by screwing the self-tapping screws 160 into the pilot holes 84 through the screw holes 44*a* formed in the pump unit 40, the pump unit 40 and the molded stator 50 can be firmly attached to each other (see FIG. 2).

Furthermore, in the molded stator 50, the extended leg portions 85 of the pilot hole component 81 are extended toward the side opposite to the side to which the pump unit 40 is attached, thereby allowing the pilot holes 84 that penetrate through the pilot hole component 81 from one to the other surfaces to be exposed in a surface on the side opposite to the side to which the pump unit 40 is attached. The self-tapping screws 160 are screwed into the pilot holes 84 exposed in the leg portions 85 of the molded stator 50 through screw holes of a pump securing portion provided in the tank unit or the like of the water heating apparatus, in which the pump 10 is installed. Thus, the pump 10 can be firmly attached to the unit.

Figure 9:
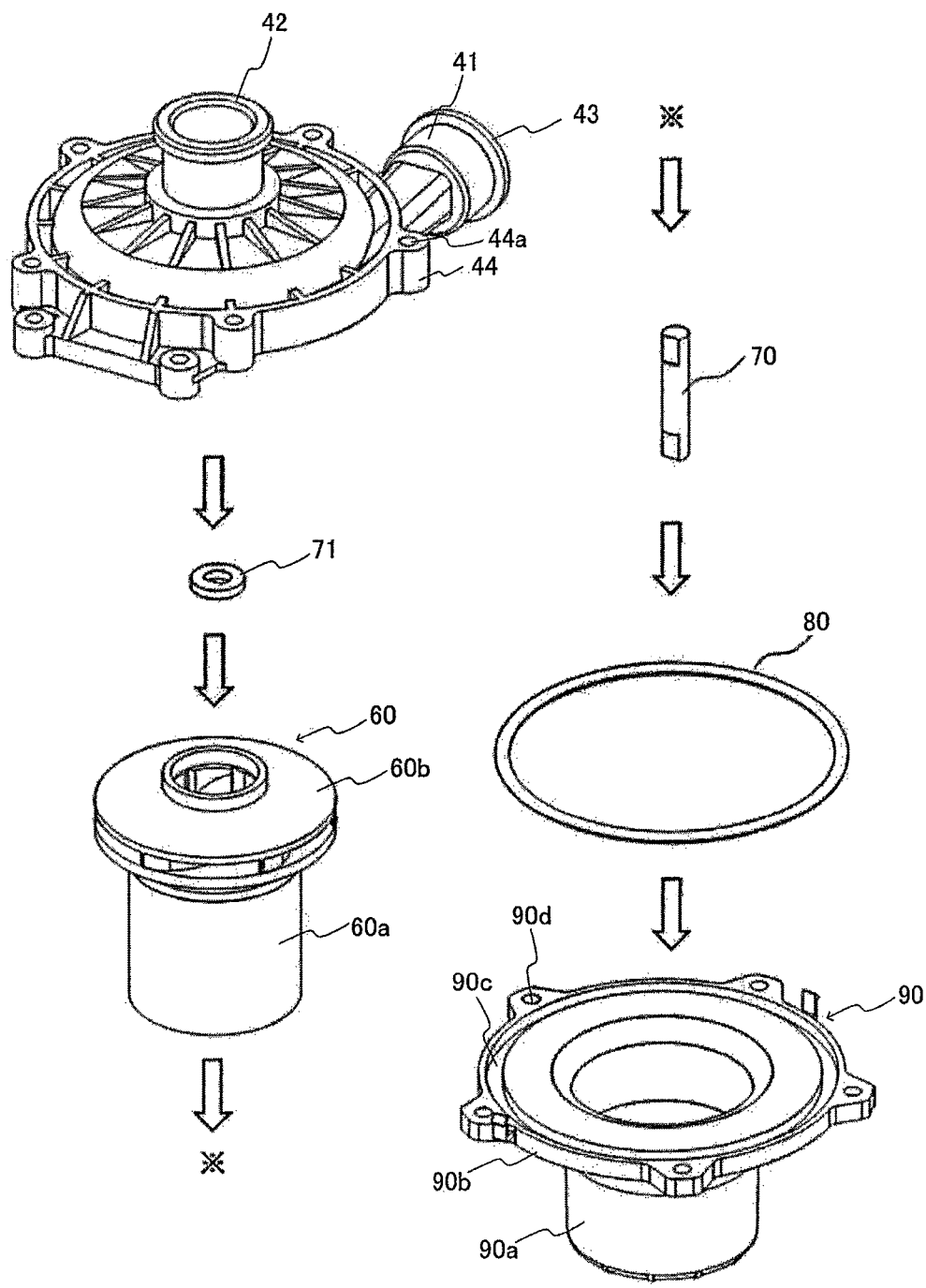
FIG. 9 is an exploded perspective view of a pump unit of the pump according to Embodiment of the present invention.
Figure 10:
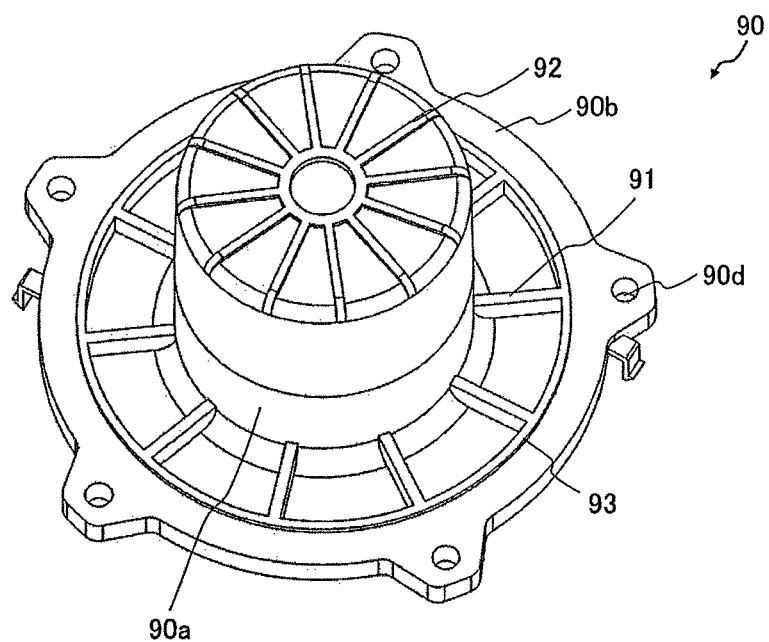
FIG. 10 is a perspective view of a cup-shaped bulkhead component of the pump according to Embodiment of the present invention as viewed from a cup-shaped bulkhead side.
Figure 11:
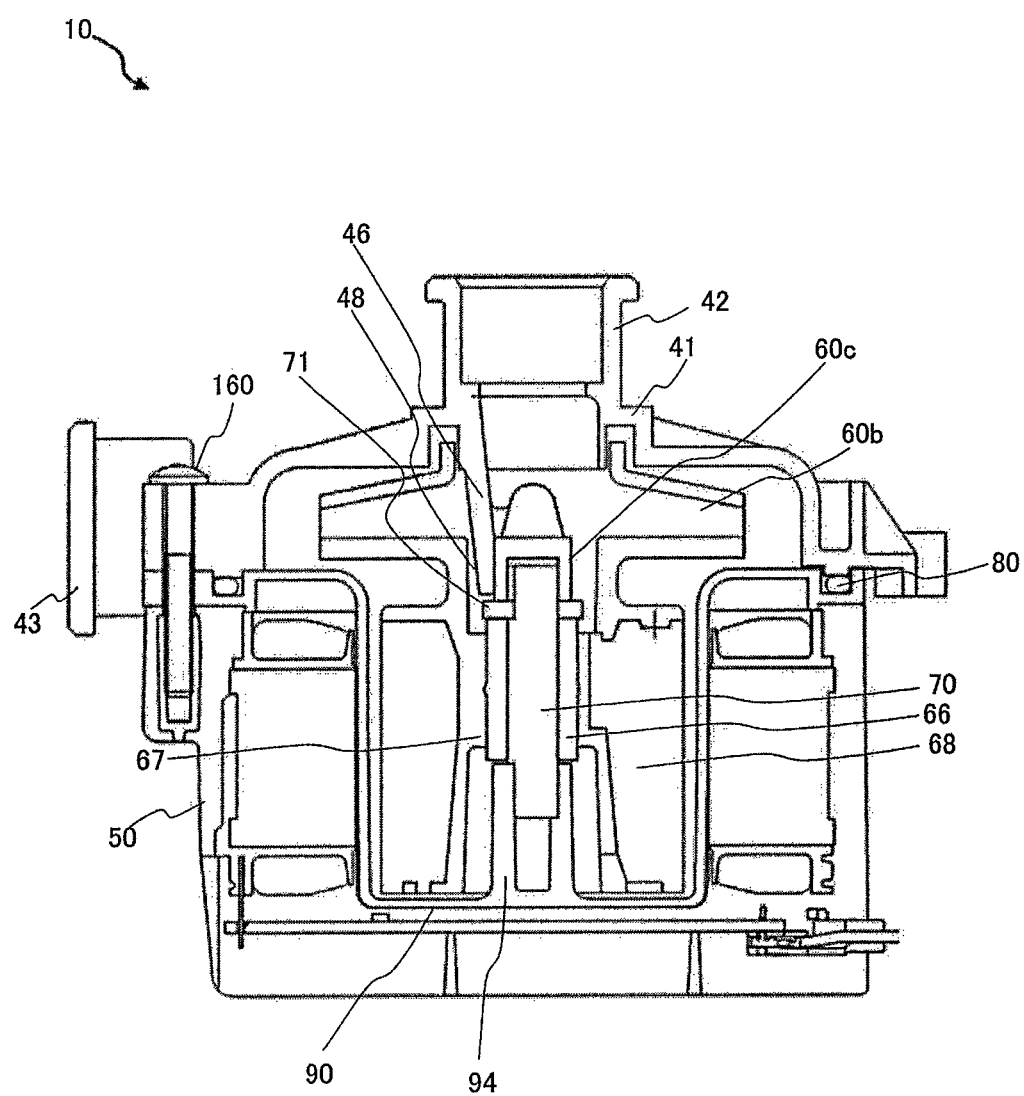
FIG. 11 is a sectional view of the pump according to Embodiment of the present invention.
Figure 12:
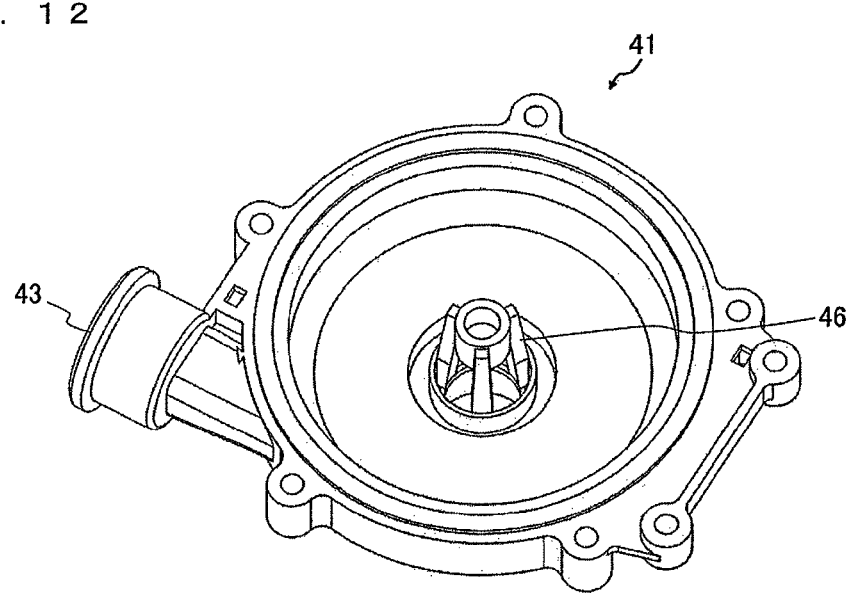
FIG. 12 is a perspective view of a casing of the pump according to Embodiment of the present invention as viewed from a shat support portion side.

Next, the structure of the pump unit 40 is described. FIG. 9 is an exploded perspective view of the pump unit 40. FIG. 10 is a perspective view of a cup-shaped bulkhead component 90 as viewed from a cup-shaped bulkhead portion 90*a* side, FIG. 11 is a sectional view of the pump 10, and FIG. 12 is a perspective view of a casing 41 as viewed from a shaft support portion 46 side.

As illustrated in FIG. 9, the pump unit 40 includes the following components:

(1) Casing 41

The casing 41 has an inlet 42 and an outlet 43 for fluid and houses an impeller 60*b* of the rotor 60 therein. The casing 41 is formed of a thermoplastic resin such as PPS (polyphenylene sulfide). The casing 41 has five boss portions 44 each having the screw hole 44*a* at an end portion on the fluid inlet 42 side. The screw holes 44*a* are used when the pump unit 40 and the molded stator 50 are attached to each other.

(2) Thrust Bearing 71

The thrust bearing 71 is formed of ceramic such as alumina. While the pump 10 is being operated, the rotor 60 is pressed against the casing 41 through the thrust bearing 71 due to the difference in pressure acting on the front and rear of the impeller 60*b* of the rotor 60. Thus, the thrust bearing 71 formed of a ceramic is used so that wear resistance and sliding properties are reliably obtained.

(3) Rotor 60

The rotor 60 includes a rotor portion 60*a* and the impeller 60*b*. A ring-shaped (cylindrical) resin magnet 68 (an example of a magnet), which is formed by molding pellets made by mixing resin and powder of a magnetic material such as ferrite, and a cylindrical sleeve bearing 66 (formed of, for example, carbon) provided inside the resin magnet 68 are integrated with each other to form the rotor portion 60*a* by a resin portion 67 formed of, for example, PPE (polyphenylene ether) or the like (see FIG. 11, which will be described later). The impeller 60*b* is formed by molding a resin such as, for example, PPE (polyphenylene ether). The rotor portion 60*a* and the impeller 60*b* are attached to each other by ultrasonic welding or the like.

(4) Shaft 70

The shaft 70 is formed of ceramic such as alumina, stainless steel, or the like. Ceramic, stainless steel, or the like is selected as the material of the shaft 70 that slides against the sleeve bearing 66 provided in the rotor 60. Thus, wear resistance and sliding properties are reliably obtained. One end of the shaft 70 is inserted into a shaft support portion 94 of the cup-shaped bulkhead component 90 and the other end of the shaft 70 is inserted into the shaft support portion 46 of the casing 41. The one end of the shaft 70 is inserted into the shaft support portion 94 of the cup-shaped bulkhead component 90 such that the shaft 70 is not rotatable relative to the shaft support portion 94. For this reason, part of a circular shape of the one end of the shaft 70 is cut off by a predetermined length (in the axial direction) so as to form a D-shape. A hole provided in the shaft support portion 94 of the cup-shaped bulkhead component 90 has a shape conforming to the shape of the shaft. Also, part of the circular shape of the other end of the shaft 70 inserted into the shaft support portion 46 of the casing 41 is cut off by a predetermined length (in the axial direction) so as to form a D-shape. Thus, the shaft 70 is symmetric about the center thereof in the length direction. The other end of the shaft 70 is rotatably inserted into the shaft support portion 46 of the casing 41. The shaft 70 is symmetric about the center thereof in the length direction so that, when inserting the shaft 70 into the shaft support portion 94 of the cup-shaped bulkhead component 90, assembling can be performed without taking care of the orientation of the shaft 70 in the up-down direction (see FIG. 9).

(5) O-Ring 80

The O-ring 80 is formed of EPDM (ethylene-propylenediene rubber) or the like. EDPM is obtained by introducing a small amount of a third component to ethylene-propylene rubber (EPM), which is a copolymer of ethylene and propylene, to provide a double bond in backbone. A variety of synthetic rubber including different types or amounts of the third component is available in the market. A typical examples of the third component include ethylidene norbornane (ENB), 1,4-hexadiene (1,4-HD), dicyclopentadiene (DCP), and the like. The O-ring 80 is held between the casing 41 of the pump unit 40 and the cup-shaped bulkhead component 90 so as to be used as sealing in a water circuit. Since heat resistance and a long life are desired for seals used in a watery environment in the pump 10 installed in the water heating apparatus or the like, heat resistance is reliably obtained by using a material formed of EPDM or the like.

(6) Cup-Shaped Bulkhead Component 90

The cup-shaped bulkhead component 90 is formed of a thermoplastic resin such as PPE (polyphenylene ether). The cup-shaped bulkhead component 90 has the cup-shaped bulkhead portion 90a, which is fitted into the molded stator 50, and a flange portion 90b. The cup-shaped bulkhead portion 90a has a circular bottom and a cylindrical bulkhead. The shaft support portion 94 erects at a substantially central portion of an inner surface of the circular bottom portion. The one end of the shaft 70 is inserted into the shaft support portion 94. The flange portion 90b has a plurality of (for example, ten) reinforcing ribs 91 (see FIG. 10) that reinforce the flange portion 90b. The reinforcing ribs 91 are formed in radial directions and arranged spokewise. The flange portion 90b also has an annular rib 93 (see FIG. 10) to be fitted in the pump unit installation surface 63 of the pump unit 40 of the molded stator 50. The flange portion 90b also has five holes 90d (see FIG. 9), through which the self-tapping screws 160 are inserted. Furthermore, the flange portion 90b has an annular O-ring fitting groove 90c (see FIG. 9) in a surface of the flange portion 90b, the surface being on the casing 41 side. The O-ring 80 is fitted into the O-ring fitting groove 90c.

After the O-ring 80 is disposed in the cup-shaped bulkhead component 90, the pump 10 is assembled by assembling the pump unit 40 by attaching the casing 41 to the cup-shaped bulkhead component 90, attaching the pump unit 40 to the molded stator 50, and securing the pump unit 40 to the molded stator 50 by the self-tapping screws 160 or the like.

By fitting ribs 92 (see FIG. 10) provided in the bottom portion of the cup-shaped bulkhead component 90 into grooves (not shown) of the molded stator 50, the pump unit 40 and the molded stator 50 are positioned relative to each other in the circumferential direction.

The rotor 60, which is fitted onto the shaft 70 inserted into the shaft support portion 94 of the cup-shaped bulkhead component 90, is housed in an inner circumference of the cup-shaped bulkhead portion 90a of the cup-shaped bulkhead component 90. Thus, in order to ensure that the molded stator 50 and the rotor 60 are coaxial with each other, it is desirable that a gap between the inner circumference of the molded stator 50 and an outer circumference of the cup-shaped bulkhead portion 90a of the cup-shaped bulkhead component 90 be as small as possible. The gap is, for example, selected to be about 0.02 to 0.06 mm.

When the gap between the inner circumference of the molded stator 50 and the outer circumference of the cup-shaped bulkhead portion 90a of the cup-shaped bulkhead component 90 is reduced, an air release channel is reduced when the cup-shaped bulkhead portion 90a of the cup-shaped bulkhead component 90 is inserted into the inner circumference of the molded stator 50. This makes it difficult to insert the cup-shaped bulkhead component 90. In order to address this, it is desirable that a groove (not shown) be provided in the axial direction in the inner circumferential portion of the molded stator 50 so as to provide the air releasing channel. In the case where the groove cannot be provided, it is desirable that the gap be set to be slightly larger than 0.02 to 0.06 mm.

Figure 13:
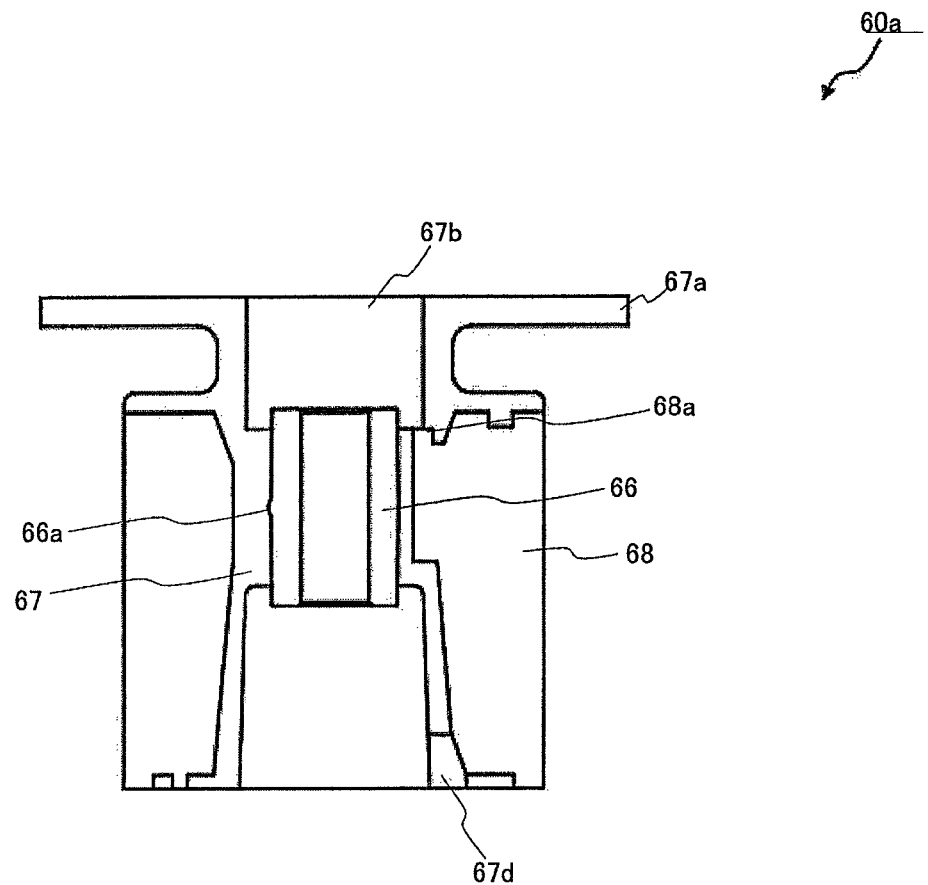
FIG. 13 is a sectional view of a rotor portion of the pump according to Embodiment of the present invention.
Figure 14:
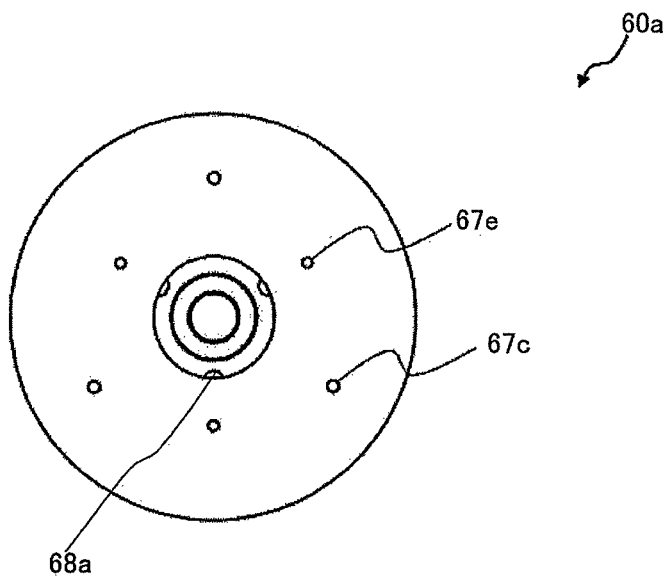
FIG. 14 is a side view of the rotor portion of the pump according to Embodiment of the present invention as viewed from an impeller attachment portion side.
Figure 15:
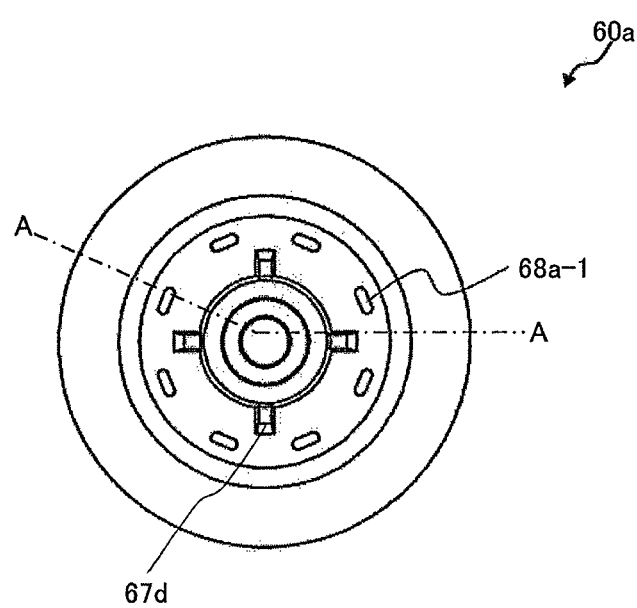
FIG. 15 is a side view of the rotor portion of the pump according to Embodiment of the present invention as viewed from a side opposite to the impeller attachment portion.
Figure 16:
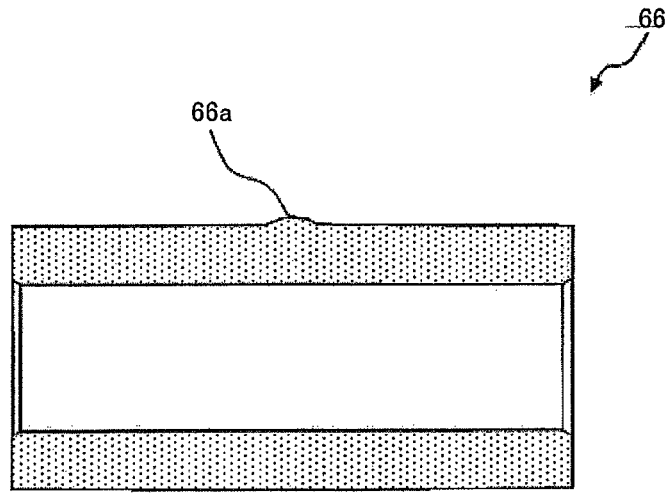
FIG. 16 is an enlarged sectional view of a sleeve bearing of the pump according to Embodiment of the present invention.

FIG. 13 is a sectional view of the rotor portion 60a (sectional view taken along line A-A in FIG. 15), FIG. 14 is a side view of the rotor portion 60a as viewed from an impeller attachment portion 67a side, FIG. 15 is a side view of the rotor portion 60a as viewed from a side opposite to the impeller attachment portion 67a side, and FIG. 16 is an enlarged sectional view of the sleeve bearing 66. The rotor portion 60a is described with reference to FIGS. 13 to 16.

As illustrated in FIGS. 13 to 16, the rotor portion 60a includes at least the following elements. The resin magnet 68 and the sleeve bearing 66 are integrated with each other by the thermoplastic resin (resin portion 67) such as, for example, PPE (polyphenylene ether).

(1) Resin Magnet 68

The resin magnet 68 has a substantially ring shape (cylindrical shape) and is formed by molding pellets made by mixing resin and powder of a magnetic material such as ferrite.

(2) Sleeve Bearing 66

The sleeve bearing 66 (for example, formed of carbon) is provided inside the resin magnet 68. The sleeve bearing 66 has a cylinder shape. The sleeve bearing 66 is fitted onto the shaft 70, which is attached to the cup-shaped bulkhead component 90 of the pump 10, and is rotated. Thus, the sleeve bearing 66 is formed of a material preferable for a bearing such as ceramic or a thermoplastic resin such as PPS (polyphenylene sulfide) to which sintered carbon or carbon fibers are added. The sleeve bearing 66 has a taper for removal, the diameter of which reduces from near the center in the axial direction toward both ends, and a plurality of semi-spherical projections 66a (see FIG. 16) near the center in the axial direction on the outer peripheral side. The projections 66a serve as stoppers against rotation.

(3) Resin Portion 67 (the Impeller Attachment Portion 67a, to which the Impeller 60b is Attached, is Integrally Formed with the Resin Portion 67 Formed of a Thermoplastic Resin)

A first recess portion 67b is formed in the resin portion 67 formed on an end plane of the resin magnet 68 on the impeller attachment portion 67a side so as to correspond to the position of a magnet pressure portion provided in an upper half of a mold for molding resin. In an example illustrated in FIG. 13, the first recess portion 67b is formed at a substantially central portion in the radial direction. The first recess portion 67b opposes projections 68a of the resin magnet 68.

As illustrated in FIG. 14, the impeller attachment portion 67a has, for example, three impeller positioning holes 67c for attachment of the impeller 60b. The impeller positioning holes 67c are substantially equally spaced apart from one another in the circumferential direction. The impeller positioning holes 67c penetrate through the impeller attachment portion 67a. The impeller positioning holes 67c are each formed on a line that radially extends from an intermediate position between two of three projections 68a of the resin magnet 68 (three projections 68a are illustrated in FIG. 14).

As illustrated in FIG. 14, the impeller attachment portion 67a also has, for example, three gates 67e (ports through which resin is injected). The gates 67e for molding the rotor portion 60a by the thermoplastic resin (resin portion 67) are substantially equally spaced apart from one another in the circumferential direction. Each of the gates 67e is formed at a position inside a corresponding one of the impeller positioning holes 67c and on a line that radially extends from a corresponding one of three projections 68a of the resin magnet 68.

Furthermore, cuts 67d are formed in the resin portion 67 formed on an inner circumferential surface of the resin magnet 68 on a side opposite to the impeller attachment portion 67a (see FIGS. 13 and 15). The cuts 67d are engaged with positioning projections (not shown) provided in a lower half of the mold for molding resin. In an example illustrated in FIG. 15, the cuts 67d are formed at four positions spaced apart from one another by about 90°. The positions of the cuts 67d corresponds to cuts 68b of the resin magnet 68 (described later, FIG. 19).

Figure 17:
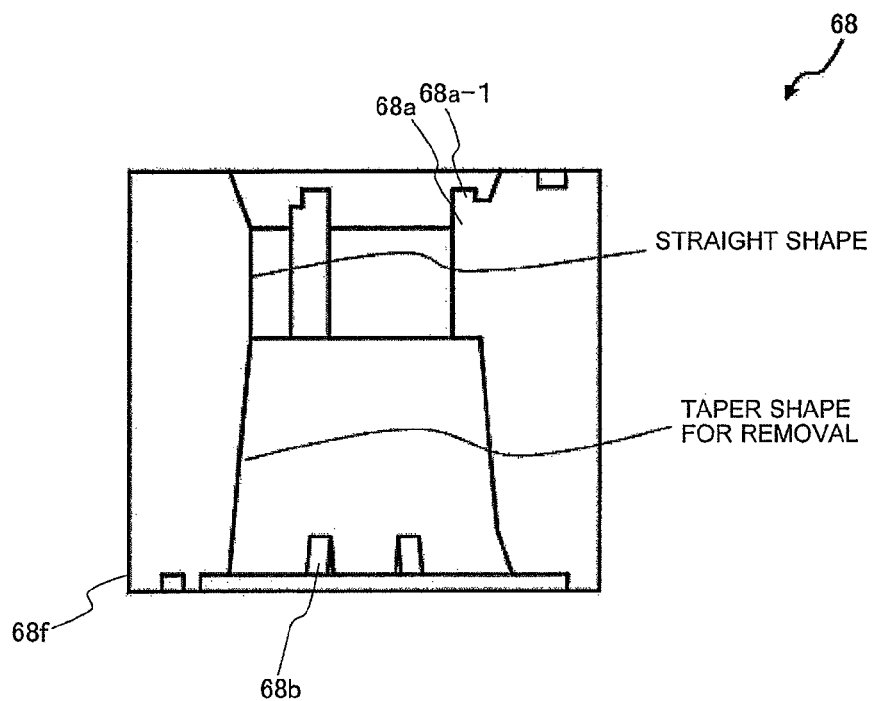
FIG. 17 is a sectional view of a resin magnet of the pump according to Embodiment of the present invention.
Figure 18:
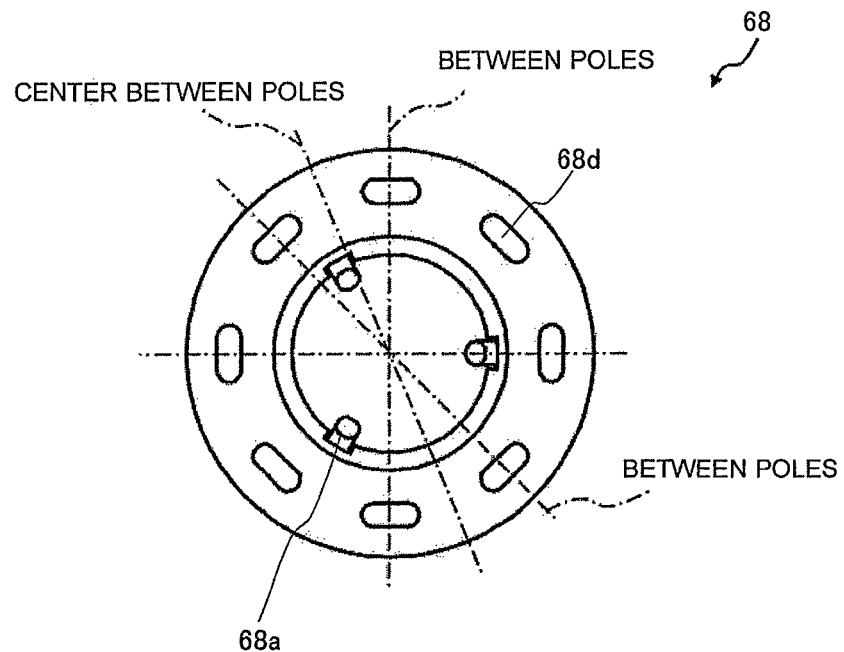
FIG. 18 is a side view of the resin magnet of the pump according to Embodiment of the present invention as viewed from a projection side.
Figure 19:
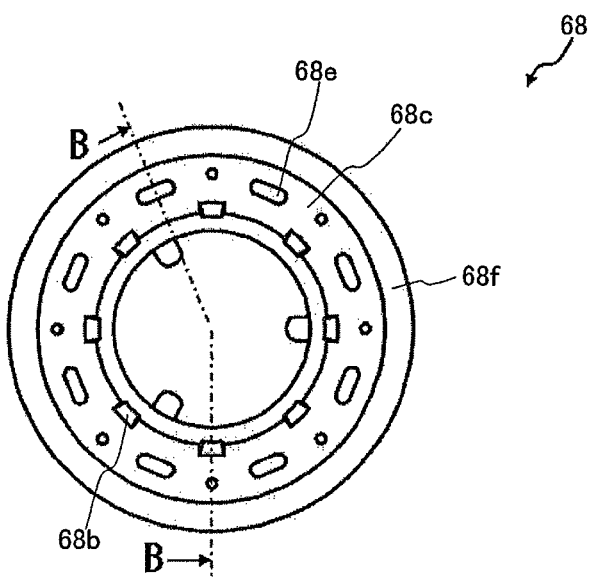
FIG. 19 is a side view of the resin magnet of the pump according to Embodiment of the present invention as viewed from a side opposite to the projections.

FIG. 17 is a sectional view of the resin magnet 68 (sectional view taken along line B-B in FIG. 19), FIG. 18 is a side view of the resin magnet 68 as viewed from the projection 68a side, and FIG. 19 is a side view of the resin magnet 68 as viewed from a side opposite to the projections 68a. Next, the structure of the resin magnet 68 is described with reference to FIGS. 17 to 19.

The resin magnet 68 described here includes eight magnetic poles. The resin magnet 68 has, in a state in which the resin magnet 68 is integrated into the rotor 60 by the resin, the plurality of taper-shaped cuts 68b on the inner circumferential side of the end plane on a side opposite to the impeller attachment portion 67a. The cuts 68b are substantially equally spaced apart from one another in the circumferential direction. In an example illustrated in FIG. 19, eight cuts 68b are provided. The cuts 68b have a tapered shape, the diameter of which is larger on the end plane side than that on the inner side in the axial direction.

The resin magnet 68 has the plurality of substantially rectangular (arc-shaped) projections 68a disposed on the inner circumferential side at a specified depth from the end plane on a side opposite to the end plane where the taper-shaped cuts 68b are formed. The projections 68a are substantially equally spaced apart from one another in the circumferential direction. In an example illustrated in FIG. 18, three projections 68a are provided.

As illustrated in FIG. 17, the projections 68a have a substantially rectangular shape in side view and has projecting portions 68a-1 on the end plane side. When the rotor portion 60a is integrally formed, the projecting portions 68a-1 at end portions of the projections 68a are held by the thermoplastic resin (resin portion 67) that forms the rotor portion 60a. Thus, even when a small gap is formed between the resin portion 67 and the resin magnet 68 due to shrinkage of the resin, rotational torque of the resin magnet 68 can be reliably transmitted. This improves the quality of the rotor portion 60a. The shape of the projections 68a is not limited to the substantially rectangular shape. The projections 68a may have any of other shapes such as a triangular, trapezoidal, semi-circular, or polygonal shape.

The resin magnet 68 has, in a state in which the resin magnet 68 is integrated into the rotor 60 by the resin, gates 68c (see FIG. 19) on a side opposite a magnetic pole position detecting element (Hall element 58b (see FIG. 5)). The gates 68c are positioned between the poles. A plastic magnet (the material of the resin magnet 68) is supplied through the gates 68c. With the gates 68c, through which the resin magnet 68 is supplied, provided between the magnetic poles on the side opposite the magnetic pole position detecting element (Hall element 58b (see FIG. 5)), variation in magnetic poles can be suppressed. Thus, accuracy in detecting magnetic pole positions can be improved, and accordingly, the quality of the pump 10 can be improved.

As illustrated in FIG. 17, a hollow portion of the resin magnet 68 has a straight shape from the end plane where the projections 68a are formed to the central position in the generally axial direction, and has a taper shape for removal from the end plane opposite the end plane where the projections 68a are formed to the central position in the generally axial direction. This improves productivity with which the resin magnet 68 is produced, and accordingly, the production cost can be reduced. That is, since the hollow portion of the resin magnet 68 serves as the taper shape for removal, the resin magnet 68 is prevented from adhering to a cavity of a fixed part of a mold. This cart improve productivity with which the resin magnet 68 is produced. The mold used to form the resin magnet 68 is separated into the fixed part of the mold and an operating part of the mold at end planes of the projections 68a on the taper shape for removal side. Since part of the hollow portion formed by the operating part of the mold has a straight shape, adherence to the cavity of the fixed part of the mold is further prevented, and accordingly, productivity with which the resin magnet 68 is produced can be improved. The resin magnet 68 is removed from the operating part of the mold by being pushed by ejector pins.

As illustrated in FIG. 19, the resin magnet 68 has a plurality of (eight in the example illustrated in FIG. 19) projecting portions 68e having a substantially elongated hole shape in section and arranged spokewise. The projecting portions 68e are disposed on the end plane of the resin magnet 68 opposite the magnetic pole position detecting element (Hall element 58b (see FIG. 5)). As illustrated in FIG. 18, the resin magnet 68 also has a plurality of (eight in an example illustrated in FIG. 18) recess portions 68d having a substantially elongated hole shape in section and arranged spokewise. The recess portions 68d are disposed in the end plane on the impeller attachment portion 67a side. When the rotor portion 60a is integrated by the thermoplastic resin (resin portion 67), the projecting portions 68e and the recess portions 68d are buried in the thermoplastic resin (resin portion 67), and the resin magnet 68 is held by the resin portion 67.

As illustrated in FIG. 19, the projecting portions 68e formed on the side opposite the magnetic pole position detecting element (Hall element 58b (see FIG. 5)) is positioned at the substantially intermediate positions between the magnetic poles formed in the rotor 60. That is, the projecting portions 68e are arranged spokewise between the gates 68c, through which the material of the resin magnet 68 is supplied.

With the projecting portions 68e provided between the poles, the magnetic forces are reliably obtained. This improves accuracy with which the Hall element 58b detects the magnetic pole position, and accordingly, the quality of the pump 10 can be improved. Also, since the magnetic forces of the resin magnet 68 are improved, the performance of the pump 10 can be improved.

Furthermore, the recess portions 68d formed in the impeller attachment portion 67a side of the resin magnet 68 are positioned between the magnetic poles formed in the rotor 60, that is, positioned substantially in the same radial directions as the gates 68c, through which the material of the resin magnet 68 is supplied, are positioned. Thus, with the recess portions 68d provided between the poles of the resin magnet 68, reduction in magnetic force can be suppressed as much as possible, and accordingly, reduction in performance of the pump 10 can be suppressed.

In the resin magnet 68, either or both of the number of projecting portions 68e formed on the side opposite the magnetic pole position detecting element (Hall element 58b (see FIG. 5)) and the number of recess portions 68d formed in the impeller attachment portion 67a side is or are the same as the number of magnetic poles formed in the rotor 60. By providing the same number of projecting portions 68e or recess portions 68d or both as the number of magnetic poles, the magnetic forces are prevent from becoming unbalanced.

The resin magnet 68 has a magnetic pole position detecting portion 68f (see FIGS. 17 and 19), which is an annular portion having a predetermined width and projects in the axial direction by a specified height in the outer circumferential portion of the end plane on the side opposite the magnetic pole position detecting element (Hall element 58b (see FIG. 5)). By reducing the distance in the axial direction between the magnetic pole position detecting portion 68f of the resin magnet 68 and the Hall element 58b mounted on the board 58, accuracy with which the magnetic pole position is detected can be improved.

The magnetic pole position detecting element uses the Hall element 58b, which is a Hall IC surface-mounted on the board 58. Leakage flux of the resin magnet 68 is detected by the Hall element 58b from the end plane in the axial direction (surface opposite the magnetic pole position detecting element) of the resin magnet 68. Thus, compared to the case where the Hall element 58b is secured to the board 58 with a Hall element holder (not shown) and main flux of the resin magnet 68 is detected from the side surface of the resin magnet 68, a processing cost and the like of the board 58 can be reduced, and accordingly, the cost of the pump 10 can be reduced.

Next, integration the rotor 60 of the pump motor by using the thermoplastic resin is described. The example here is the resin magnet 68.

The mold with which the resin magnet 68 and the sleeve bearing 66 are integrated with each other by the resin includes a fixed part of the mold and an operating part of the mold (not shown). Initially, the sleeve bearing 66 is set in the operating part of the mold. Since the sleeve bearing 66 is symmetric about the center in the vertical axial direction, the sleeve bearing 66 can be set in the mold with the orientation thereof in the up-down direction arbitrarily selected. Although the sleeve bearing 66 has the plurality of projections 66a on the outer circumferential portion (see FIG. 16), the positions of the projections 66a are not particularly limited. Thus, the sleeve bearing 66 can be set in the mold with the orientation thereof in the rotational direction also arbitrarily selected. This simplifies a work process of integrating the resin magnet 68 and the sleeve bearing 66 with each other by the resin. Thus, productivity is improved, and accordingly, the production cost can be reduced.

When the sleeve bearing 66 is set in the operating part of the mold, the inner diameter portion thereof is held by a sleeve bearing insertion portion (not shown) provided in the operating part of the mold. This allows accuracy of the coaxiality between the sleeve bearing 66 and the resin magnet 68, which will be set in a later step, to be reliably obtained.

After the sleeve bearing 66 has been set in the operating part of the mold, the resin magnet 68 is set by engaging the taper-shaped cuts 68b, which is provided in the inner diameter portion of one end plane of the resin magnet 68 (end plane on the side opposite to the impeller attachment portion 67a in the rotor 60 of the pump motor state), with positioning projection (not shown) provided in the operating part of the mold. In the example illustrated in FIG. 19, eight cuts 68b are provided. Out of these cuts 68b, four cuts 68b spaced apart from one another by about 90° are engaged with the positioning projections (not shown) of the operating part of the mold. Eight cuts 68b are provided in order to improve work efficiency with which the resin magnet 68 is set in the operating part of the mold.

Furthermore, the magnet pressing portion (not shown) of the fixed part of the mold is pressed in the axial direction against the substantially rectangular projections 68a, which are formed on the inner circumferential portion of the other end plane of the resin magnet 68 (end plane on the impeller attachment portion 67a side of the state of the rotor 60 of the pump motor). Thus, the positional relationship between the sleeve bearing 66 and the resin magnet 68 is reliably established and it is ensured that the sleeve bearing 66 and the resin magnet 68 are coaxial with each other.

In the example illustrated in FIG. 16, a total of three of the substantially rectangular (arc-shaped) projections 68a are provided on the inner circumference of the resin magnet 68. The mold attachment surfaces (portions pressed by the mold) of the projections 68a are exposed after the integration by the resin has been performed. Three projections 68a are provided in order to loosen molding conditions for the integration by the resin, and accordingly, improve productivity by reliably obtaining accuracy with which the resin magnet 68 is positioned and, at the same time, reliably providing channels through which the thermoplastic resin for the integration by the resin flows.

Even when there is a gap between the resin magnet 68 insertion portion (not shown) of the lower half of the mold and the outer diameter of the resin magnet 68, the coaxiality between a projection pressing portion (not shown) of the fixed part of the mold and an inner diameter pressing portion (positioning projection) is reliably obtained. This configuration makes it possible that the positional relationship and the coaxiality between the sleeve bearing 66 and the resin magnet 68 can be reliably obtained. This can improve the quality of the pump 10.

Inversely, by forming a gap between the resin magnet 68 insertion portion not shown) of the operating part of the mold and the outer diameter portion of the resin magnet 68, work efficiency with which the resin magnet 68 is set in the mold is improved, and accordingly, the production cost is reduced.

After the resin magnet 68 and the sleeve bearing 66 have been set in the mold, thermoplastic resin such as PPE (polyphenylene ether) is subjected to injection mold, thereby forming the rotor portion 60a. At this time, portions of the resin magnet 68, the portions being not pressed by the mold, which include the cuts 68b (FIG. 19), that is, four cuts 68b, the projecting portions 68e provided on the end plane of the resin magnet 68 on the side opposite the magnetic pole position detecting element, and the recess portions 68d provided in the end plane on the impeller attachment portion 67a side, are buried in the resin portion 67 of thermoplastic resin and serve as portions that transmit rotational torque. Furthermore, with the projecting portions 68e and the recess portions 68d buried in the resin portion 67 of thermoplastic resin, the resin magnet 68 is firmly held.

After the resin magnet 68 and the sleeve bearing 66 are integrated with each other by the thermoplastic resin (resin portion 67), the resin magnet 68 is magnetized. In so doing, the resin magnet 68 can be accurately magnetized by utilizing the cuts 67d (four cuts in the drawing), which are formed in the inner circumferential surface of the end plane of the resin magnet 68 of the rotor portion 60a on the side opposite to the impeller attachment portion 67a, for positioning during the magnetization.

As described, according to Embodiment, the following effects are obtained.

(1) In the molded stator 50, the pilot hole component 81 attached to the stator 47 is integrated with the stator 47 by the resin for molding. In this state, the pilot holes 84 of the leg portions 85 of the pilot hole component 81, the pilot holes 84 being for the self-tapping screws, are exposed, and the self-tapping screws are screwed into the pilot holes 84 through the screw holes of the pump securing portion provided in the tank unit or the like of the water heating apparatus, in which the pump 10 is installed, thereby attaching the pump 10 to the unit. Thus, the pump unit 40 can be firmly attached to the molded stator 50.

(2) The pilot hole component 81 has the pilot holes used to attach the pump unit 40 to the molded stator 50 and the pilot holes used to attached the pump 10 to the unit in which the pump 10 is installed. Thus, the pump 10 can be firmly attached to the unit in which the pump 10 is installed without preparing a separate component.

(3) In the connecting portion 87 of the pilot hole component 81, the portions substantially central between the leg portions 85 radially project by a specified distance so as to form the substantially cylindrical shapes. The substantially cylindrical portions have the gates 88, through which the thermoplastic resin for molding the pilot hole component is injected. The resin is injected from the portions substantially central between the leg portions 85. This allows the pilot hole component 81 to be stably formed.

(4) The inner diameter portion of the pilot holes 84 for the self-tapping screws, the pilot holes 84 being provided in the leg portions 85 of the pilot hole component 81, have a straight shape. Thus, the pilot hole component 81 can be prevented from adhering to the cavity of the mold. This can improve productivity with which the pilot hole component 81 is produced.

Figure 20:
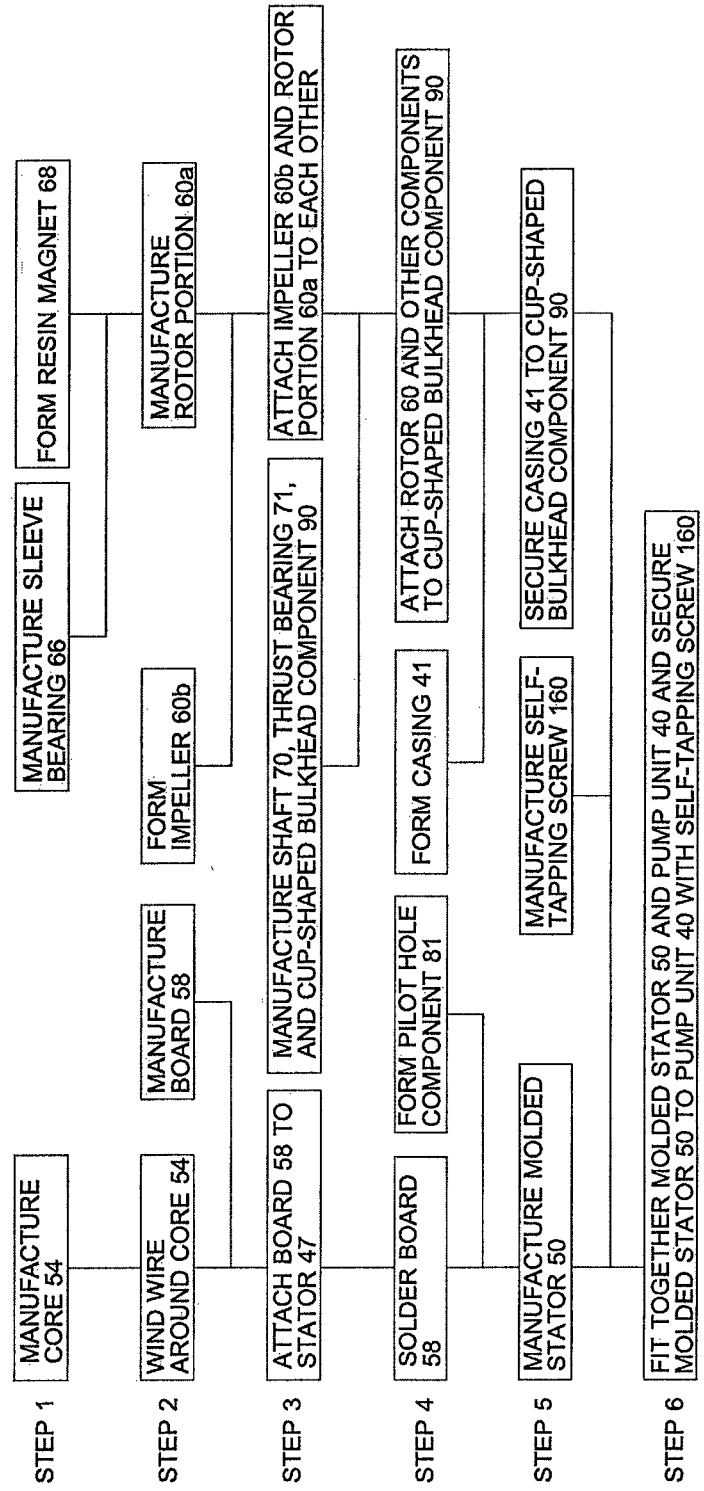
FIG. 20 is a chart illustrating production steps of the pump according to Embodiment of the present invention.

FIG. 20 is a chart illustrating production steps of the pump 10. The production steps of the pump 10 are described below with reference to FIG. 20.

(1) Step 1

Electrical steel sheets having a thickness of about 0.1 to 0.7 mm are punched to form strips, which are subjected to caulking, welding, bonding, or the like to produce the laminated strip-shaped stator core 54. In addition, the sleeve bearing 66 is produced. In addition, the resin magnet 68 is formed.

(2) Step 2

Wires are wound around the stator core 54. The teeth of the strip-shaped stator core 54 are provided with the insulating portions 56 formed of thermoplastic resin such as PBT (polybutylene terephthalate). The teeth are connected to one another by the thin connecting portion. The coils 57 are wound in concentrated winding around the teeth provided with the insulating portions 56. For example, twelve concentrated winding coils 57 are connected to one another so as to form windings of a three-phase single Y connection. Since the windings are of the three-phase single Y connection, the terminals 59 (the neutral terminal and the power terminals through which the power is supplied), to which the coils 57 of each phase (U-phase, V-phase, W-phase) are connected, are attached to the connection sides of the insulating portions 56.

In addition, the board 58 is produced. The board 58 is clamped between the insulating portions 56 and the board pressing component 95 by the board pressing component 95. The IC that drives the motor (brushless DC motor), the Hall element that detects the position of the rotor 60, and the like are mounted on the board 58. The lead cable guiding component 61, through which the lead cable 52 is drawn out, is attached at the cut portion near the outer circumferential edge portion of the board 58.

In addition, the rotor portion 60a is produced. The rotor portion 60a is formed by integrating the ring-shaped (cylindrical) resin magnet 68, which is formed by molding pellets made by mixing resin and powder of a magnetic material such as ferrite, and the cylindrical sleeve bearing 66 (formed of, for example, carbon) provided inside the resin magnet 68 with each other by the resin formed of for example, PPE (polyphenylene ether) or the like.

In addition, the impeller 60b is formed. The impeller 60b is formed of a thermoplastic resin such as PPE (polyphenylene ether).

(3) Step 3

The board 58 is attached to the stator 47 in which the stator core 54 is provided with the windings. The board 58, to which the lead cable guiding component 61 has been attached, is secured to the insulating portions 56 with the board pressing component 95.

In addition, the impeller 60b is attached to the rotor portion 60a by ultrasonic welding or the like.

In addition, the cup-shaped bulkhead component 90 is formed.

In addition, the shaft 70 and the thrust bearing 71 are produced. The shaft 70 is formed of stainless steel. The thrust bearing 71 is formed of ceramic.

(4) Step 4

Soldering is performed with the board 58. The terminals 59 (the neutral terminal and the power terminals through which the power is supplied) are soldered to the board 58.

In addition, the pilot hole component 81 having the thin connecting portion 87 and the plurality of substantially cylindrical leg portions 85, which are connected to one another by the thin connecting portion 87, is formed. The leg portions 85 have the pilot holes 84, into which the self-tapping screws 160 are screwed when the pilot hole component 81 is attached to the pump unit 40, and the projections 83, which are brought into contact with the mold for molding during molding. In the pilot hole component 81, at least one of the leg portions 85 are extended by a predetermined length toward the side opposite to the end planes of the pilot holes 84 on the opening side. These leg portions 85 have the pilot holes 84 that penetrate therethrough between the end planes at both the ends thereof.

In addition, the casing 41 is formed. The casing 41 is formed of a thermoplastic resin such as PPS (polyphenylene sulfide).

In addition, components such as the rotor 60 are attached to the cup-shaped bulkhead component 90.

(5) Step 5

The molded stator 50 is produced. By attaching the pilot hole component 81 to the stator 47, the stator assembly 49 is completed. The resin is molded around the stator assembly 49 so as to produce the molded stator 50.

In addition, the casing 41 is secured to the cup-shaped bulkhead component 90, thereby the pump unit 40 is assembled.

In addition, the self-tapping screws 160 are produced.

(6) Step 6

The pump 10 is assembled. The pump unit 40 and the molded stator 50 are fitted together and the pump unit 40 is secured to the molded stator 50 by the self-tapping screws 160. Specifically, the pump unit 40 and the molded stator 50 are secured to each other by fitting the pump unit 40 and the molded stator 50 together and screwing the self-tapping screws 160 into the pilot holes 84 exposed in the molded stator 50 through the screw holes 44a of the pump unit 40.

Figure 21:
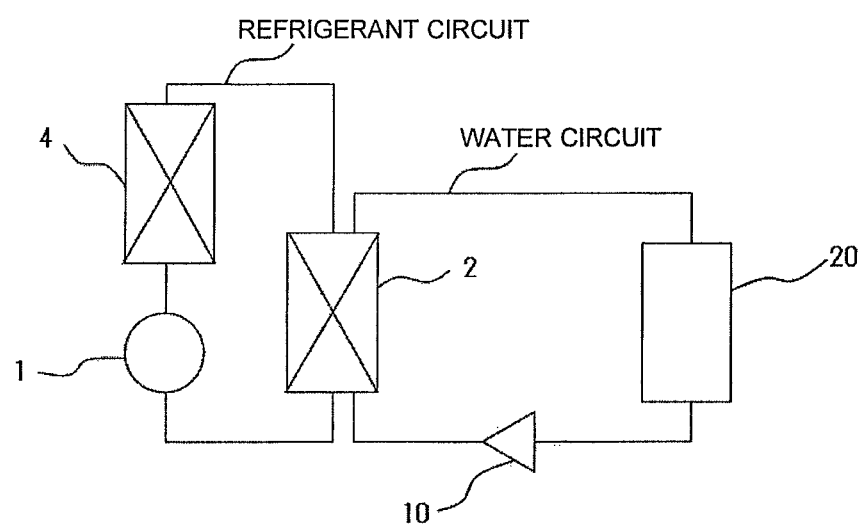
FIG. 21 is a conceptual diagram illustrating a circuit configuration of a refrigeration cycle device, which uses a refrigerant-water heat exchanger, according to Embodiment of the present invention.

FIG. 21 is a conceptual diagram illustrating a circuit configuration of the refrigeration cycle device that uses the refrigerant-water heat exchanger 2. The heat-pump water heating apparatus 300 described with reference to FIG. 1 is an example of the refrigeration cycle device that uses the refrigerant-water heat exchanger 2.

Examples of apparatus that uses the refrigerant-water heat exchanger 2 include an air-conditioning apparatus, a floor heating apparatus, a water heating apparatus, and the like. The pump 10 according to Embodiment is disposed in a water circuit of an apparatus that uses the refrigerant-water heat exchanger 2 so as to cause water (hot water) cooled or heated by the refrigerant-water heat exchanger 2 to circulate in the water circuit.

As illustrated in FIG. 21, the refrigeration cycle device that uses the refrigerant-water heat exchanger 2 includes a refrigerant circuit that includes the compressor 1 (for example, a scroll compressor, a rotary compressor, or the like), the refrigerant-water heat exchanger 2, the evaporator 4 (heat exchanger), and so forth. The compressor 1 compresses the refrigerant. The refrigerant-water heat exchanger 2 causes the refrigerant and water to exchange heat. A water circuit, which includes the pump 10, the refrigerant-water heat exchanger 2, a load 20, and so forth, is also provided. That is, the refrigerant circuit and the water circuit are connected to each other by the refrigerant-water heat exchanger 2 so as to transfer/receive heat.

In the case where the pump 10, in which the rotor 60 of the pump motor is installed, is applied to the refrigeration cycle device that uses the refrigerant-water heat exchanger 2, the quality and performance of the pump 10 are improved and productivity with which the pump 10 is produced is improved. This allows the performance and the quality of the refrigeration cycle device that uses the refrigerant-water heat exchanger 2 to be improved and the cost of the refrigeration cycle device to be reduced.

REFERENCE SIGNS LIST 1 compressor 2 refrigerant-water heat exchanger 3 pressure reducing device 4 evaporator 5 pressure detector 6 fan motor 7 fan 8 heated water temperature detecting means 9 supplied water temperature detecting means 10 pump 11 operation unit 12 tank unit controller 13 heat pump unit controller 14 hot water tank 15 refrigerant pipe 16 hot water circulation pipe 17 outside air temperature detecting means 20 load 31 bathwater reheating heat exchanger 32 bathwater circulator 33 mixing valve 34 tank water temperature detector 35 reheated water temperature detector 36 mixed water temperature detector 37 bathwater reheating pipe 40 pump unit 41 casing 42 inlet 43 outlet 44 boss portion 44a screw hole 46 shaft support portion 47 stator 48 annular recess portion 49 stator assembly 50 molded stator 52 lead cable 53 resin for molding 54 stator core 54a groove 56 insulating portion 57 coil 58 board 58b Hall element 59 terminal 60 rotor 60a rotor portion 60b impeller 60c sliding component lead cable routing component 63 pump unit installation surface 66 sleeve bearing 66a projection 67 resin portion 67a impeller attachment portion 67b first recess portion 67c hole 67d out 67e gate 68 resin magnet 68a projection 68a-1 projection portion 68b cut 68c gate 68d recess portion 68e projecting portion 68f magnetic pole position detecting portion 70 shaft 71 thrust bearing 80 O-ring 81 pilot hole component 82 mold pressing portion 83 projection 84 pilot hole 85 leg portion 85a projection 86 hook 87 connecting portion 88 gate 90 cup-shaped bulkhead component 90a cup-shaped bulkhead portion 90b flange portion 90c ring fitting groove 90d hole 91 reinforcing rib 92 rib 93 annular rib 94 shaft support portion 95 board pressing component 95a projection 100 heat pump unit 160 self-tapping screw 200 tank unit 300 heat-pump water heating apparatus

The invention claimed is:

1. A pump comprising:
a molded stator that includes a pilot hole component, the pilot hole component having a plurality of leg portions having pilot holes; and
a pump unit including a plurality of screw holes adjacent an outer circumferential portion of the pump unit,
the molded stator including a pump unit installation surface on which the pump unit is installed,
the plurality of leg portions including first leg portions each having a blind pilot hole extending through the pump unit installation surface and second leg portions each having a through pilot hole extending through the pump unit installation surface and extending through an end plane on a side of the pilot hole component opposite the pump installation surface, wherein
the pump unit and the molded stator are attached to each other by screwing self-tapping screws into the pilot holes of the pump unit installation surface of the molded stator and through the screw holes of the pump unit so as to form the pump, and
the first leg portions and the second leg portions are connected to one another by a thin connecting portion.

2. The pump of claim 1,
wherein a plurality of projections are provided on an outer circumferential portion of the leg portions of the pilot hole component and configured to prevent the pilot hole component from being rotated.

3. The pump of claim 1,
wherein the leg portions of the pilot hole component each have a tapered shape, the thickness of which increases as a distance from the pump unit installation surface increases.

4. The pump of claim 1,
wherein the connecting portion of the pilot hole component has a plurality of hooks for attaching the pilot hole component to a stator portion of the molded stator.

5. The pump of claim 4, wherein
the stator portion includes a stator core having a plurality of teeth around which coils are wound, the teeth being provided with insulating portions,
a board is attached to the stator portion, an electrical component is mounted on the board, and a lead cable guiding component, through which a lead cable is drawn out, is attached to the board, and
the stator core has grooves at an outer circumferential portion thereof, and the hooks of the pilot hole component are hooked in the grooves.

6. The pump of claim 1,
wherein at least one of the leg portions of the pilot hole component has a projection that is disposed on the end plane opposite to the pump unit installation surface side, and used to position the pilot hole component in the axial direction.

7. The pump of claim 1,
wherein an outer diameter of the leg portion on an end of the pump unit installation surface side is set to be larger than an inside diameter of an opening provided in the pump unit installation surface.

8. The pump of claim 1,
wherein the connecting portion of the pilot hole component has a cylindrical portion that projects from the connecting portion between the leg portions.

9. The pump of claim 8,
wherein the cylindrical portion has a gate through which resin for forming the pilot hole component is injected.

10. The pump of claim 1,
wherein the pilot holes of the leg portions have a straight shape.

11. A refrigeration cycle device comprising:
the pump of claim 1 disposed in a water circuit connected to a refrigerant circuit through a refrigerant-water heat exchanger.

12. The pump of claim 1,
wherein the plurality of leg portions include a third leg portion having a pilot hole extending through the pump unit installation surface and a pilot hole extending through the end plane opposite to the pump installation surface.

13. A method of producing a pump, the method comprising:
   a step of producing a stator by providing a tooth of a stator core with an insulating portion and winding a coil around the tooth provided with the insulating portion;
   a step of producing a rotor portion by integrating a resin magnet and a sleeve bearing provided inside the resin magnet with each other by resin and producing an impeller,
   a step of attaching the board to the stator, producing a rotor by attaching the impeller to the rotor portion, and producing a cup-shaped bulkhead component, a shaft, and a thrust bearing;
   a step of producing a pilot hole component having a plurality of leg portions, wherein the plurality of leg portions include first leg portions each having a blind pilot hole extending through a pump unit installation surface of the molded stator and second leg portions each having a through pilot hole extending through the pump unit installation surface and extending through an end plane on a side of the pilot hole component opposite the pump installation surface, the first leg portions and the second leg portions are connected to one another;
   a step of producing a molded stator by integrating the stator and the pilot hole component with each other by a resin for molding, assembling a pump unit by securing a cup-shaped bulkhead portion, wherein the rotor is attached in the cup-shaped bulkhead portion such that a shaft, engaged with the rotor, is not rotatable, the rotor portion and the impeller are provided to the rotor, and producing the pump unit having a plurality of screw holes near an outer circumferential portion thereof by attaching the cup-shaped bulkhead component; and
   a step of attaching the pump unit and the molded stator to each other by fitting the pump unit to the pump installation surface of the molded stator via the pilot holes extending through the first leg portions and screwing self-tapping screws into the screw holes of the pump unit and the pilot holes of the molded stator.

14. The method of claim 13,
wherein, when the resin for molding is molded to produce the molded stator, an end plane of the pilot hole component on a side through which the pilot holes of the first leg portions extend and a projection of the pilot hole component provided on the other end plane are clamped by a mold for resin molding and position the pilot hole component in an axial direction.

* * * * *